(12) United States Patent
Ito

(10) Patent No.: US 6,176,177 B1
(45) Date of Patent: Jan. 23, 2001

(54) APPARATUS FOR CHAMFERING BLOCKS OF VEGETABLE

(75) Inventor: Kojiro Ito, Tokyo (JP)

(73) Assignee: Yamatenosan Co., Ltd., Tokyo (JP)

( * ) Notice: Under 35 U.S.C. 154(b), the term of this patent shall be extended for 0 days.

(21) Appl. No.: 09/341,130

(22) PCT Filed: Jan. 13, 1998

(86) PCT No.: PCT/JP98/00094

§ 371 Date: Jul. 13, 1999

§ 102(e) Date: Jul. 13, 1999

(87) PCT Pub. No.: WO98/30369

PCT Pub. Date: Jul. 16, 1998

(30) Foreign Application Priority Data

Jan. 13, 1997 (JP) .................................................. 9-015885

(51) Int. Cl.[7] ...................................................... B26D 1/03
(52) U.S. Cl. ................................ 99/592; 99/593; 99/589; 99/545; 99/543; 99/537
(58) Field of Search ............................. 99/537, 540, 541, 99/546, 584, 589, 543, 590, 591, 593, 592, 545; 83/352, 404, 409.2, 425.2

(56) References Cited

U.S. PATENT DOCUMENTS

| 4,372,184 | * | 2/1983 | Fisher et al. | 99/545 X |
| 5,337,640 | * | 8/1994 | Arnoth et al. | 99/545 X |
| 5,582,096 | * | 12/1996 | Marton | 99/589 |

FOREIGN PATENT DOCUMENTS 53-158774  * 12/1978 (JP) .
60-49785  * 3/1985 (JP) .

* cited by examiner

Primary Examiner—Reginald L. Alexander
(74) Attorney, Agent, or Firm—Jones, Tullar & Cooper, P.C.

(57) ABSTRACT

The present invention relates to an improvement in a chamfering machine for chamfering blocks of vegetable such as carrots or potatoes. A conventional vegetable block chamfering machine uses a chamfering blade having a crank-like axle integrally connected thereto with its opposite handles aligned with the blade edge, permitting the chamfering blade to rotate freely about its opposite handles. An improved chamfering machine according to the present invention is free of any kind of malfunction as would be often caused in the conventional chamfering machine, and is capable of chamfering blocks of vegetable effectively. A chamfering blade is placed in the path in which a selected block of vegetable is transported, the edge of the chamfering blade being directed to the vegetable block. The chamfering blade is integrally connected to a blade axle, which is placed in engagement with guide and the blade axle is fixed to one end of a swingable rod. A vegetable carrier is placed in front of the chamfering blade. A vegetable block transporting transports the block of vegetable on the transporting way with the block of vegetable pinched and held, and the vegetable block transporting is operatively connected to the other end of the swingable rod, thus permitting the swingable rod to swing about the blade axle, allowing the chamfering blade to turn about the blade axle while moving and chamfering the block of vegetable under the guidance provided by the guide in the counter direction to the direction in which the block of vegetable is transported.

4 Claims, 20 Drawing Sheets

APPARATUS FOR CHAMFERING BLOCKS OF VEGETABLE

TECHNICAL FIELD

The present invention relates to an apparatus for chamfering cuboid blocks of vegetables.

It is often requested that vegetables, such as carrots or potatoes be cut to provide bite-sized blocks of carrots or potatoes. Such blocks of carrots or potatoes have a cuboid form with ridges extending along its corners. These ridges give an unpleasant touch in one's mouth, and are easily broken when boiled, thus making the soup thick. Therefore, such bite-sized blocks are preferably chamfered to give a rounded shape as a whole before cooking.

The chamfered block looks like a Rugby ball, having convex sides. Assuming that cuboid blocks of vegetable are chamfered manually with a kitchen knife, even a skilled hasher can chamfer 200 to 400 pieces for one hour at best. If food is prepared for many people, such skilled hashers cannot be allotted such a less-important work.

In an attempt to facilitate such work a machine is proposed for chamfering cuboid blocks of vegetable (see Japanese Patent Application Laid-Open No.9-248791).

The vegetable block chamfering machine has a chamfering blade fixed to a crank-like axle with the edge of the chamfering blade aligned with the opposite lateral handles of the crank-like axle, and the opposite lateral handles of the crank-like axle are fixed rotatably to a stand frame of the chamfering machine, thereby permitting the chamfering blade to be tilted about the crank-like axle against a block of vegetable when the chamfering blade meets with the counter force caused by advance of the block of vegetable on the chamfering blade. Thus, the cuboid block of vegetable can be chamfered so that it may be contoured to be given a Rugby ball-like shape.

Attaching the chamfering blade about its pivot axle for free tilting, however, has the defect of abruptly increasing the resistance to the turning of the chamfering blade if vegetable debris is stuck to the pivot axle of the chamfering blade, preventing the smooth cutting, and what is worse, deforming blocks of vegetable and breaking the chamfering blade as a result of stress convergence at the blade-to-axle joint.

SUMMARY OF THE INVENTION

One object of the present invention is to provide a vegetable block chamfering machine having the pivot axle of the chamfering blade fixed to an associated link mechanism, thereby permitting the tilting of the chamfering blade to be controlled through the agency of the link mechanism, thus assuring that the vegetable block chamfering machine is free of such defects as described above.

According to a first aspect of the present invention a vegetable block chamfering machine is constructed as follows:

a single chamfering blade is placed in the path in which a selected cuboid block of vegetable is made to advance, and the chamfering blade is oriented with its edge directed to the block of vegetable; a pivot axle of the chamfering blade is placed in engagement with guide means, and is fixed to one end of a swingable rod via an intervening connection rod; a vegetable carrier having means for pinching a selected cuboid block of vegetable is set in front of the chamfering blade for carrying the block of vegetable toward the chamfering blade; and the vegetable carrier is operatively connected to the one end of the swingable rod, thereby permitting the swingable rod to swing about the other or pivot end of the swingable rod in unison with the advance of the vegetable carrier so that the chamfering blade may be tilted about its pivot axle while being guided by the guide means, thus chamfering the block of vegetable.

According to a second aspect of the present invention a vegetable block chamfering machine is constructed as follows:

two chamfering blades are placed at different levels with their edges directed to a cuboid block of vegetable for simultaneously chamfering the same, the two chamfering blades being in the path in which the cuboid block of vegetable is made to advance; the pivot axle of the first chamfering blade is placed in engagement with guide means, and is fixed to one end of a swingable rod via an associated intervening connection rod whereas the pivot axle of the second chamfering blade is placed in engagement with the guide means, and is fixed to the swingable rod via an associated intervening connection rod; a vegetable carrier having means for pinching a selected cuboid block of vegetable is set in front of the chamfering blade for carrying the cuboid block of vegetable toward the first and second chamfering blades; and the vegetable carrier is operatively connected to the one end of the swingable rod, thereby permitting the swingable rod to swing about the other or pivot end of the swingable rod in unison with the advance of the vegetable carrier so that the first and second chamfering blades may be tilted about their pivot axles while being guided by the guide means, thus chamfering the cuboid block of vegetable at the upper and lower levels.

According to a third aspect of the present invention a vegetable block chamfering machine is constructed as follows:

two chamfering blades are parallel-arranged with their edges directed to a cuboid block of vegetable for simultaneously chamfering the same, the two chamfering blades being in the path in which a selected cuboid block of vegetable is made to advance; the pivot axle of the first chamfering blade is placed in engagement with guide means, and is fixed at each end to one end of a swingable rod whereas the pivot axle of the second chamfering blade is placed in engagement with the guide means, and is fixed at each end to another swingable rod; a driving plate which can be moved back and forth on a linear passage, and is operatively connected to the one end of each swingable rod; a vegetable carrier having means for pinching a selected cuboid block of vegetable is set in front of the chamfering blades, carrying the block of vegetable toward the first and second chamfering blades; and the vegetable carrier is operatively connected to a driving plate, thereby permitting the swingable rods to swing about the other or pivot ends of the swingable rods in unison with the advance of the vegetable carrier so that the first and second chamfering blades may be tilted about their pivot axles while being guided by the guide means, thus chamfering the block of vegetable in the opposite planes parallel to the direction in which the block of vegetable is transported.

Finally according to a fourth aspect of the present invention a vegetable block chamfering machine is so constructed as follows:

five chamfering blades for effecting a required chamfering at one time, that is, a single inverted "V"-shaped blade for cutting and removing the opposite upper ridges of the cuboid vegetable block, two horizontal blades at different levels for cutting and removing the top and bottom of the cuboid vegetable block, and two vertical blades spaced apart from each other for cutting and removing the opposite sides of the cuboid vegetable block are placed sequentially in the path in which the vegetable block is made to advance, all chamfering blades being oriented with their edges directed to the vegetable block;

the pivot axle of the inverted "V"-shaped blade is placed in engagement with first guide means, and is fixed at each end to one end of one or the other first swingable rod; the pivot axle each of the second horizontal blades is placed in engagement with second guide means, and is fixed at each end to one end of one or the other second swingable rod; and the pivot axle each of the third vertical blades is placed in engagement with third guide means, and is fixed to one end of one or the other third swingable rod;

first and second driving plates which can be moved back and forth in linear passages, the first driving plate being operatively connected to the other ends of the first and second swingable rods whereas the second driving plate being operatively connected to the other ends of the third swingable rod;

a vegetable carrier having means for pinching a selected cuboid block of vegetable is set in front of the chamfering blades, carrying the block of vegetable toward the first and second chamfering blades; and the vegetable carrier is operatively connected to the first and second driving plates, thereby permitting the swingable rods to swing about the other or pivot ends of the swingable rods in unison with the advance of the vegetable carrier so that the chamfering blades may be tilted about their pivot axles while being guided by the guide means, thus chamfering the block of vegetable at all sides in planes parallel to the direction in which the block of vegetable is transported.

DESCRIPTION OF THE PREFERRED EMBODIMENTS

The accompanying drawings show two embodiments of the present invention, that is, FIGS. 1 to 6 show a first embodiment, and FIGS. 7 to 22 show a second embodiment.

Figure 1:
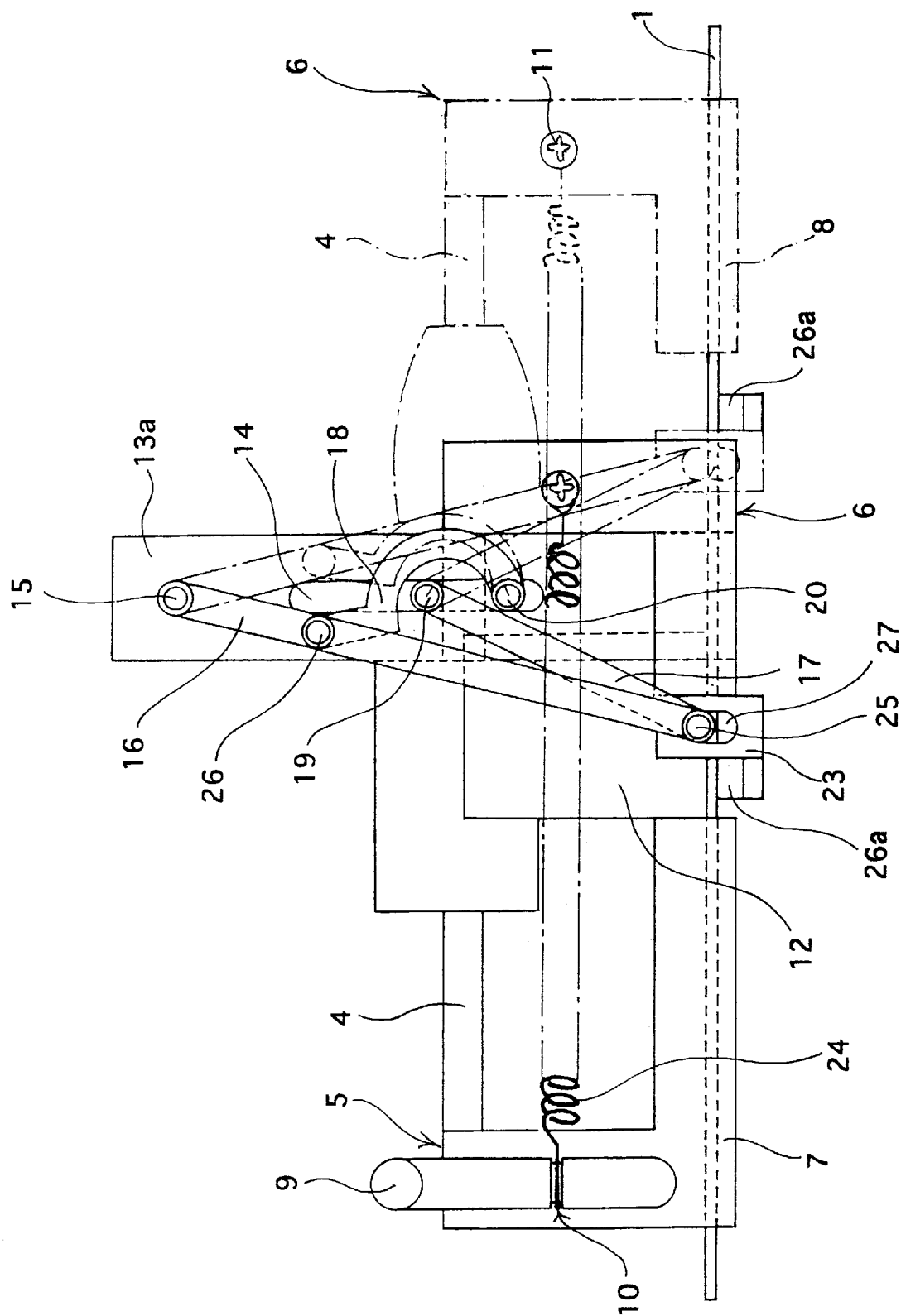
FIG. 1 is a side view of a vegetable block chamfering machine according to a first embodiment of the present invention.
Figure 2:
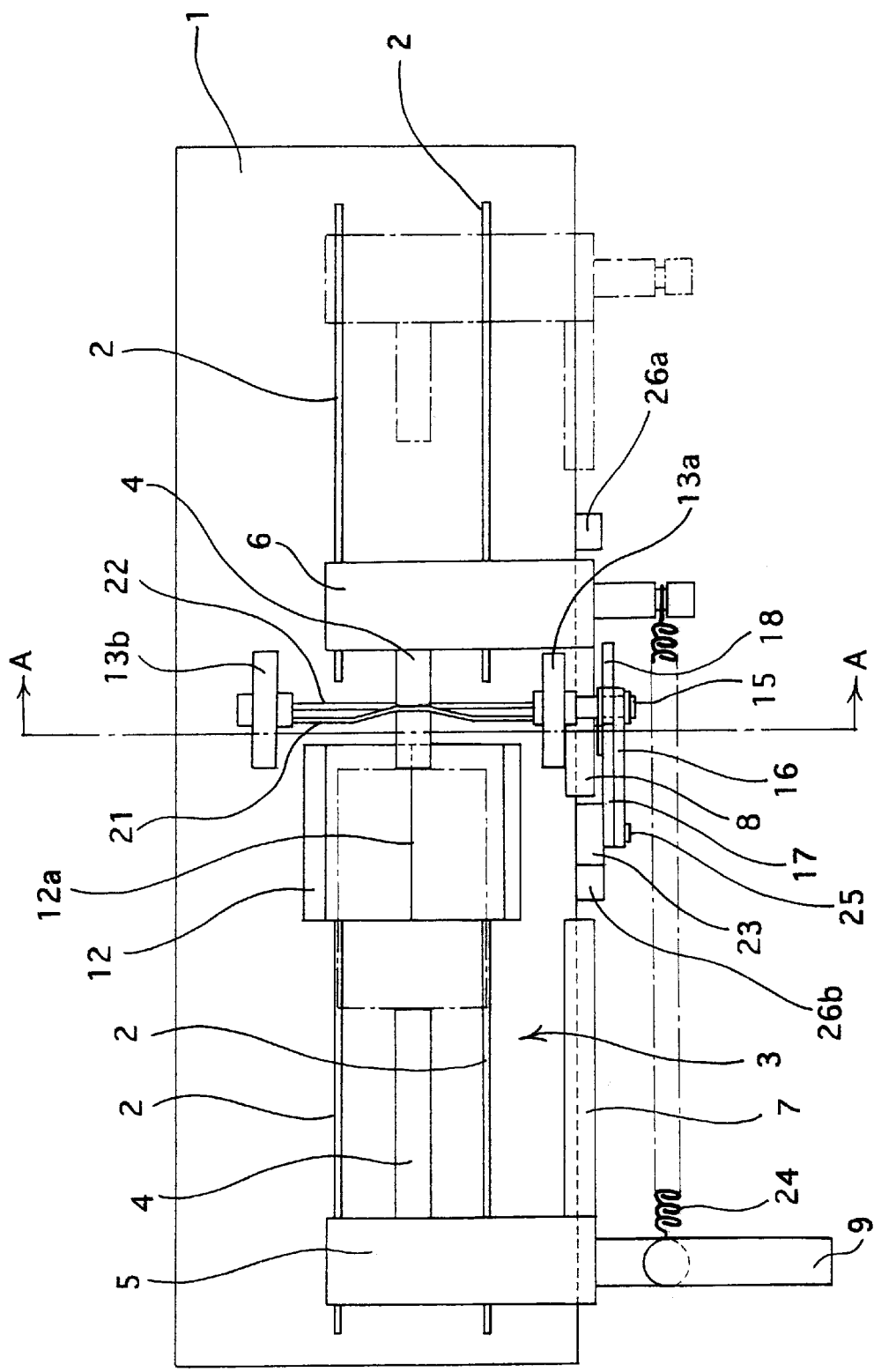
FIG. 2 is a plane view of the vegetable block chamfering machine of FIG. 1.
Figure 3:
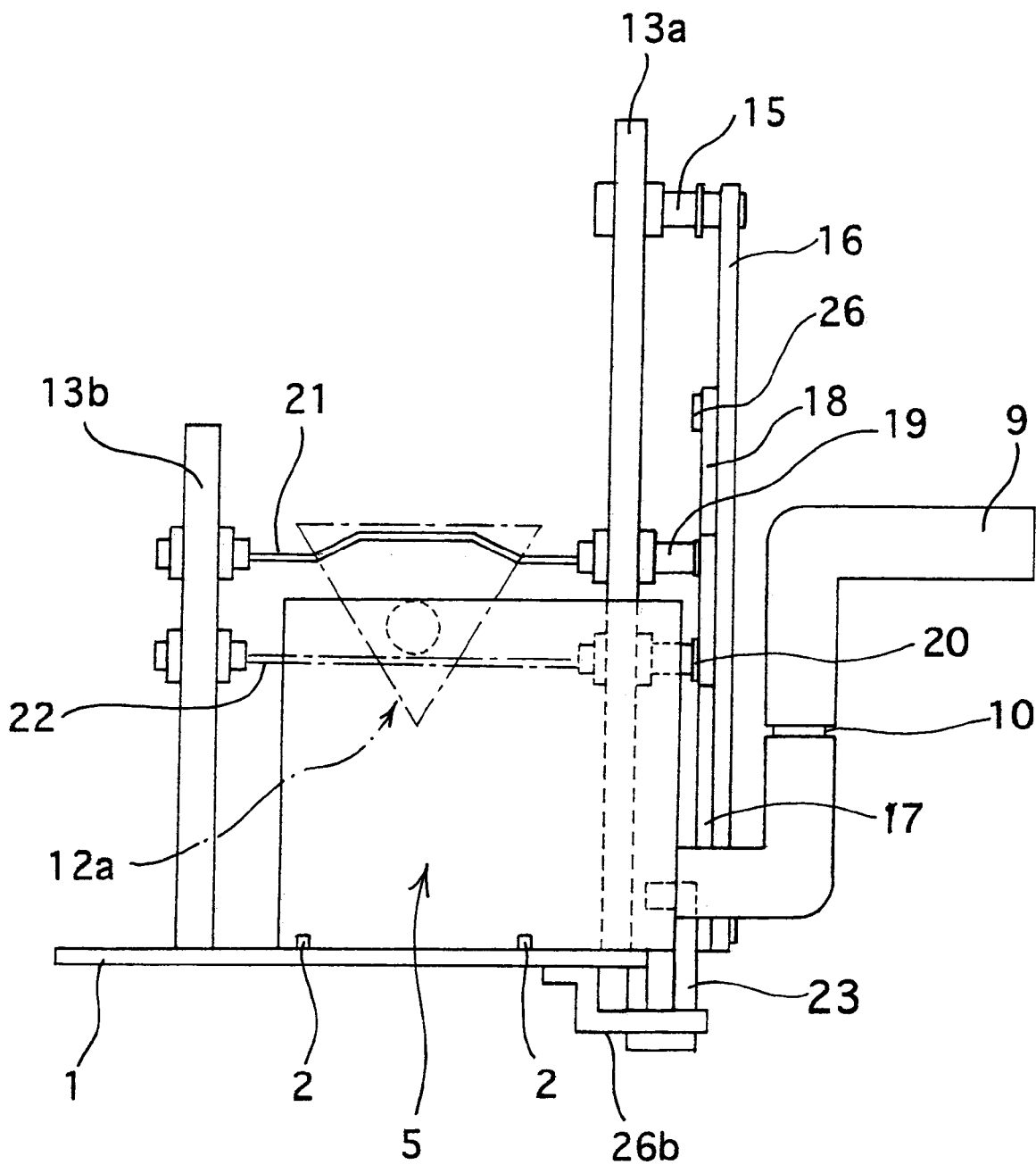
FIG. 3 is a front view of the vegetable block chamfering machine of FIG. 1.
Figure 4:
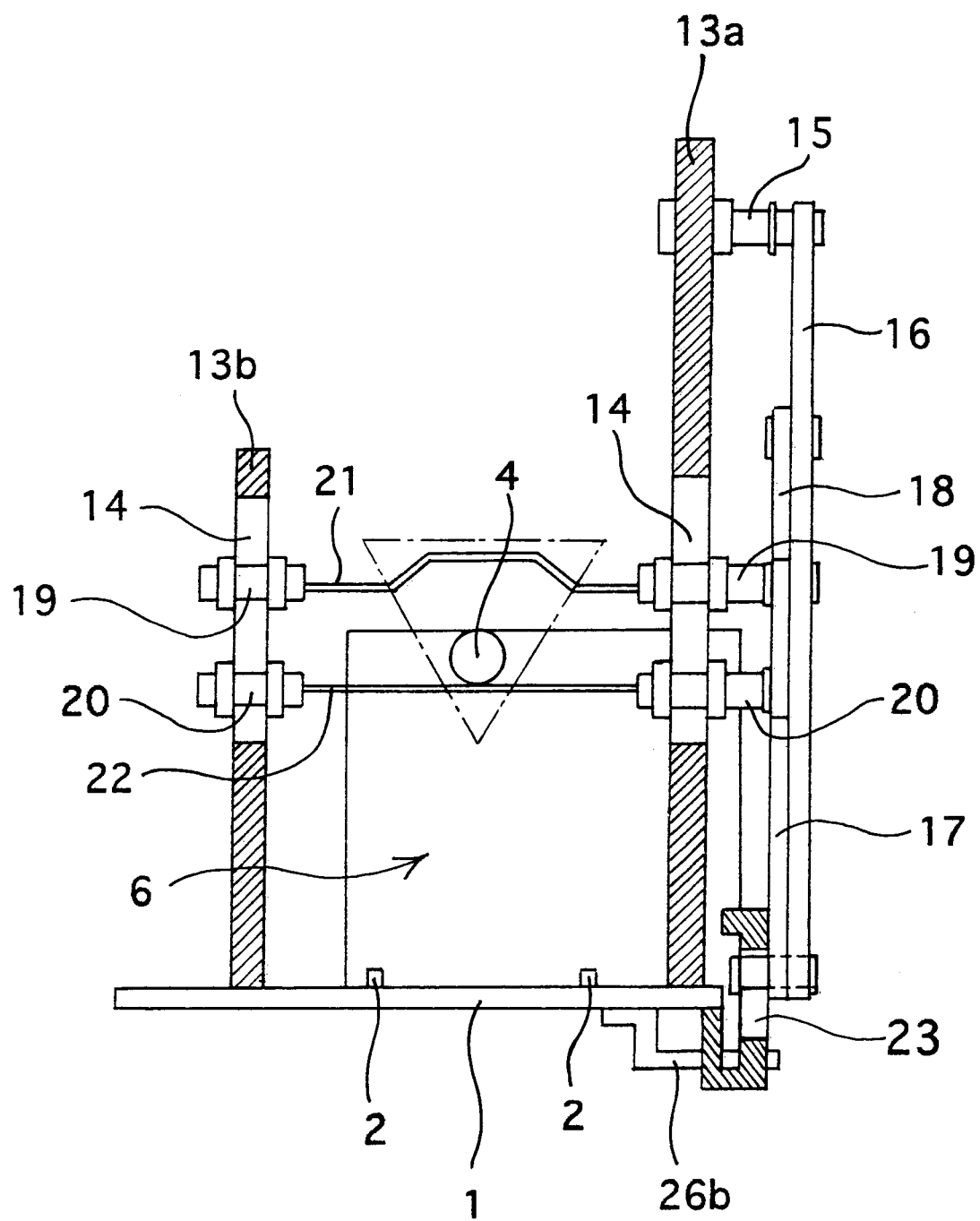
FIG. 4 is a sectional view of the vegetable block chamfering machine taken along the line A—A in FIG. 2.

At first, a vegetable block chamfering machine according to the first embodiment is described below. FIG. 1 is a side view of the chamfering machine; FIG. 2 is a plane view of the chamfering machine; FIG. 3 is a front view of the chamfering machine; and FIG. 4 is a sectional view of the chamfering machine taken along the line A—A in FIG. 2.

A machine frame 1 has two vertical guide plates 13a and 13b standing upright intermediate of the flat bed of the machine frame 1. Each vertical guide plate has a vertical guide slot 14 made therein. Upper and lower chamfering blades 21 and 22 have their axles 19 and 20 slidably fitted in the vertical guide slots 14 of the opposite vertical guide plates 13a and 13b, thus permitting the upper and lower blades 21 and 22 to move up and down.

In place of such guide slots 14 vertical grooves may be made in the opposite guide plates 13a and 13b for snugly accommodating the blade axles.

The upper and lower chamfering blades 21 and 22 have their axles 19 and 20 vertically aligned, and are so oriented that their edges are directed to a block of vegetable.

A swingable rod 16 is rotatably fixed at one end to one vertical guide plate 13a at a level higher than the vertical guide slot 14, thereby permitting the swingable rod 16 to swing back and forth about its pivot axle 15. An upper blade raising-and-lowering connection rod 17 is rotatably connected at one end to the other end of the swingable rod 16, and is fixedly connected at the other end to the axle 19 of the upper chamfering blade 21. A lower blade lowering-and-raising connection rod 18 is rotatably connected at one end to a selected portion 26 of the swingable rod 16, and is fixedly connected at the other end to the axle 20 of the lower chamfering blade 22. The lower blade lowering-and-raising connection rod 18 is semi-circular in shape (see FIG. 1) to avoid any interference with the upper blade raising-and-lowering connection rod 19.

The upper chamfering blade 21 has a trapezoid-like shape as seen from FIGS. 3 and 4 in this particular example. It may have an arch-like or triangular shape.

A vegetable carrier 12 is movably set a predetermined distance ahead of the upper and lower chamfering blades 21 and 22. The vegetable carrier 12 has a "V"-shaped groove 12a formed on its top surface. Two parallel guide rails 2 are laid on the flat base of the machine frame, and vegetable transporting means 3 is adapted to run on the pair of parallel guide rails 2. The vegetable transporting means 3 comprises movable front and rear walls 5 and 6 both riding on the guide rails 2. These front and rear walls 5 and 6 have confronting push rods 4 and 4 fixed thereon. These push rods 4 and 4 extend above the "V"-shaped groove 12a of the vegetable carrier 12 for pinching an elongated cuboid block of vegetable between the confronting push rods 4 and 4.

Also, the front and rear movable walls 5 and 6 have confronting longitudinal push-extensions 7 and 8 formed on their bottoms. The front movable wall 5 has a lateral handle extension 9 formed on its outer side. The lateral handle extension 9 has a groove 10 formed thereon. The rear movable wall 6 has a stud pin 11 on its outer side at the same level as the groove 10 of the lateral handle extension 9. A length of coiled spring 24 is fixed to the front and rear movable walls 5 and 6 by permitting its opposite ends to be caught by the groove 10 and the stud pin 11 so that it may be stretched therebetween to pull these walls 5 and 6 toward each other.

A slider block 23 is adapted to move back and forth along one side of the machine frame 1 in a certain limited intermediate range between the confronting longitudinal push-extensions 7 and 8. The slider block 23 can be moved back and forth by moving the longitudinal push-extensions 7 and 8 with the aid of the lateral handle extension 9.

The slider block 23 has a vertical slot 27 formed therein, and the joint between the swingable rod 16 and the upper blade raising-and-lowering connection rod 17 is movably fitted in the vertical slot 27. Detents 26a and 26b are positioned to be apart a predetermined distance on either side of the intermediate position of the vertical guide plate 13a on the machine frame 1.

Figure 5:
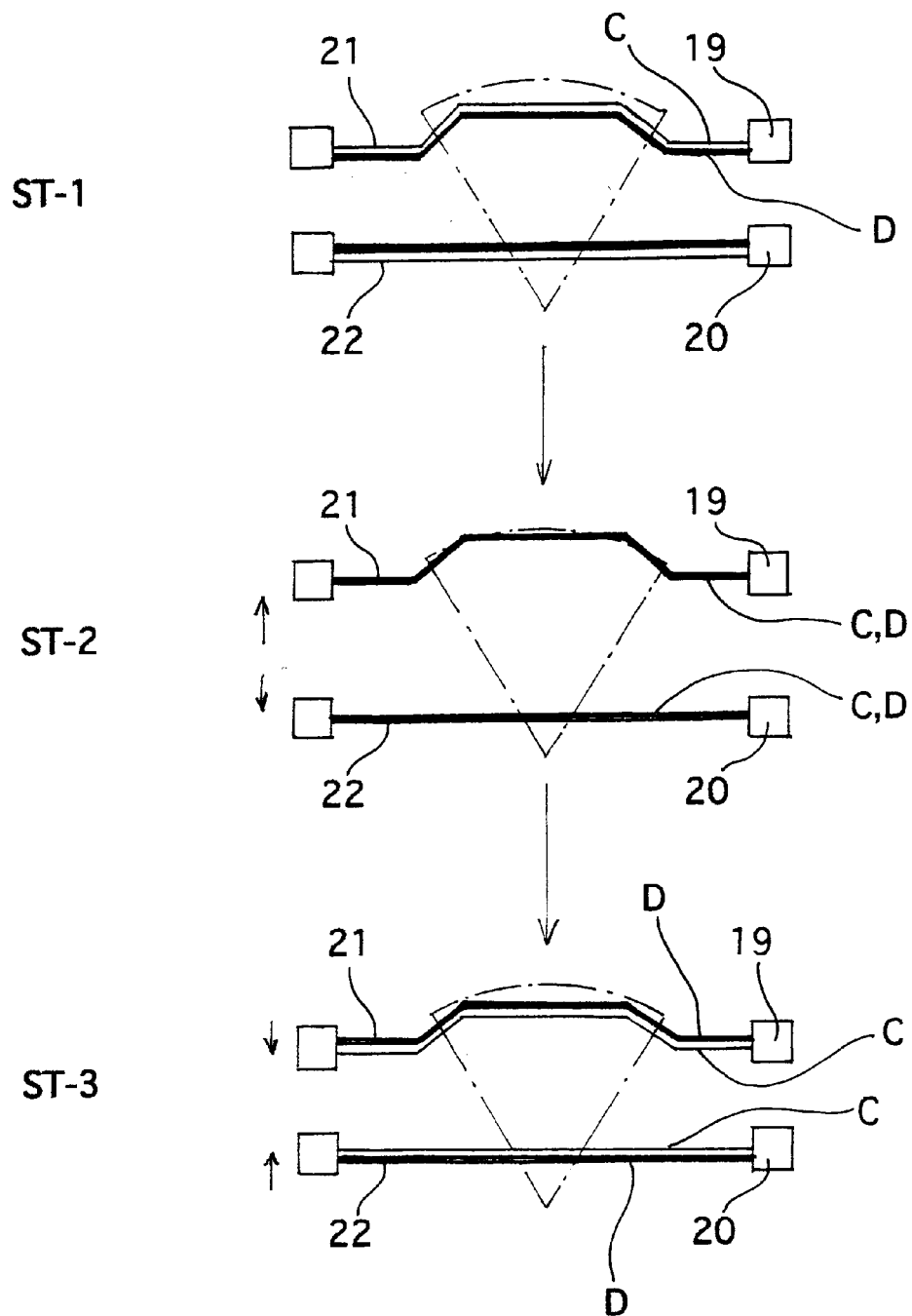
FIG. 5 shows how the chamfering blades are tilted in chamfering a block of vegetable.
Figure 6:
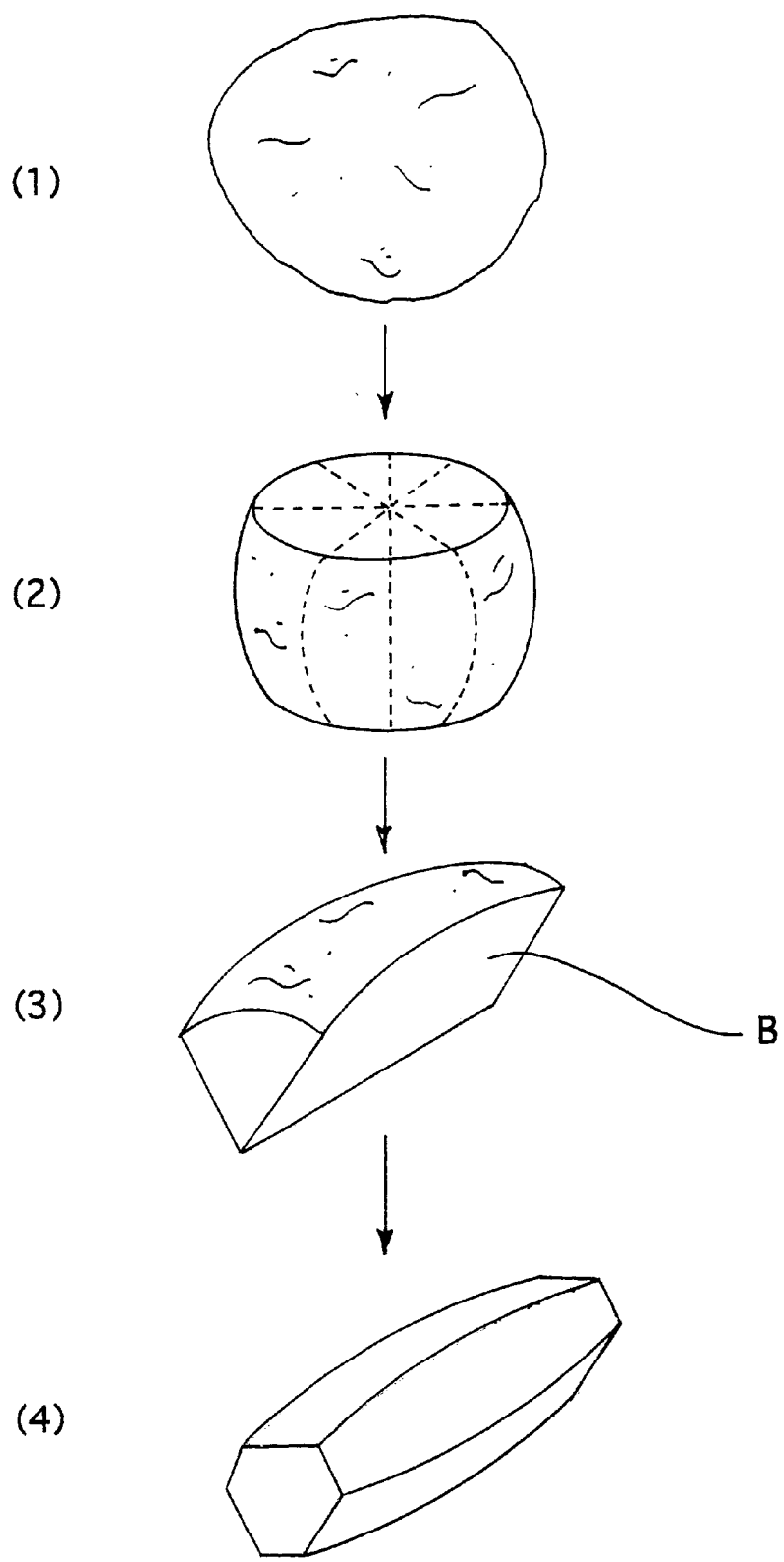
FIG. 6 shows how a piece of vegetable is cut into a cuboid block of vegetable, and how the cuboid block of vegetable is chamfered.
Figure 7:
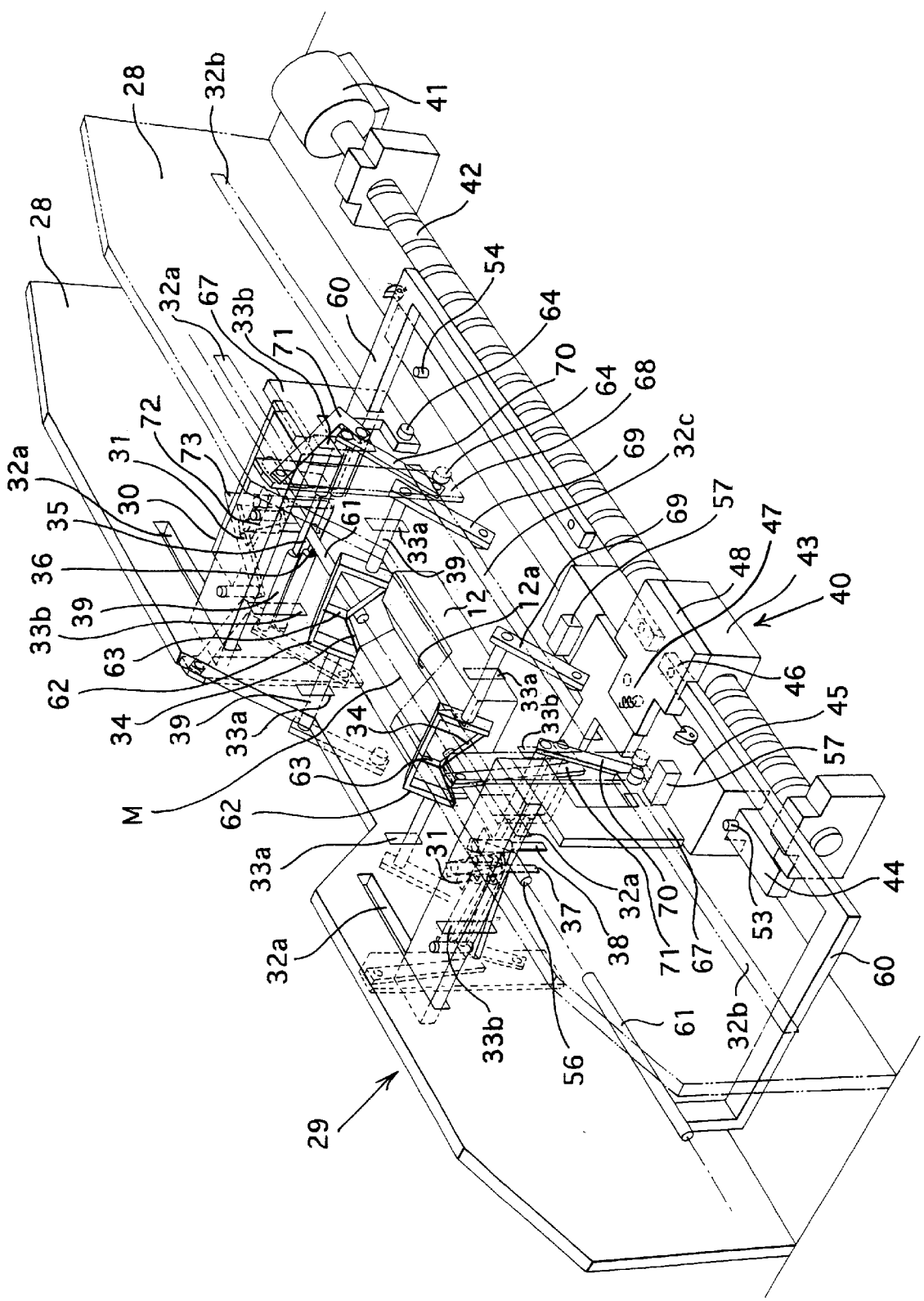
FIG. 7 is a perspective view of a vegetable block chamfering machine according to a second embodiment of the present invention.
Figure 8:
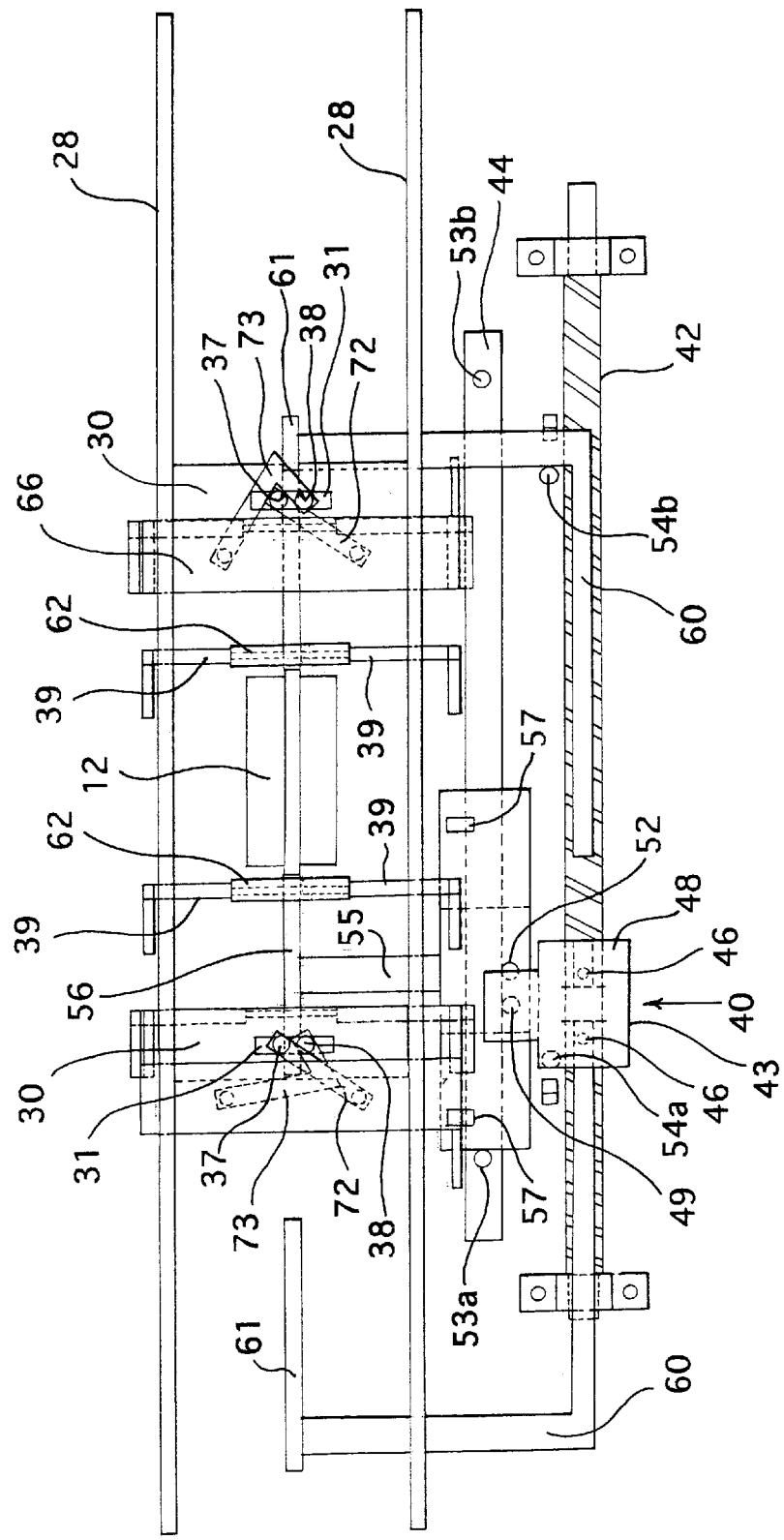
FIG. 8 is a plane view of the vegetable block chamfering machine of FIG. 7.
Figure 9:
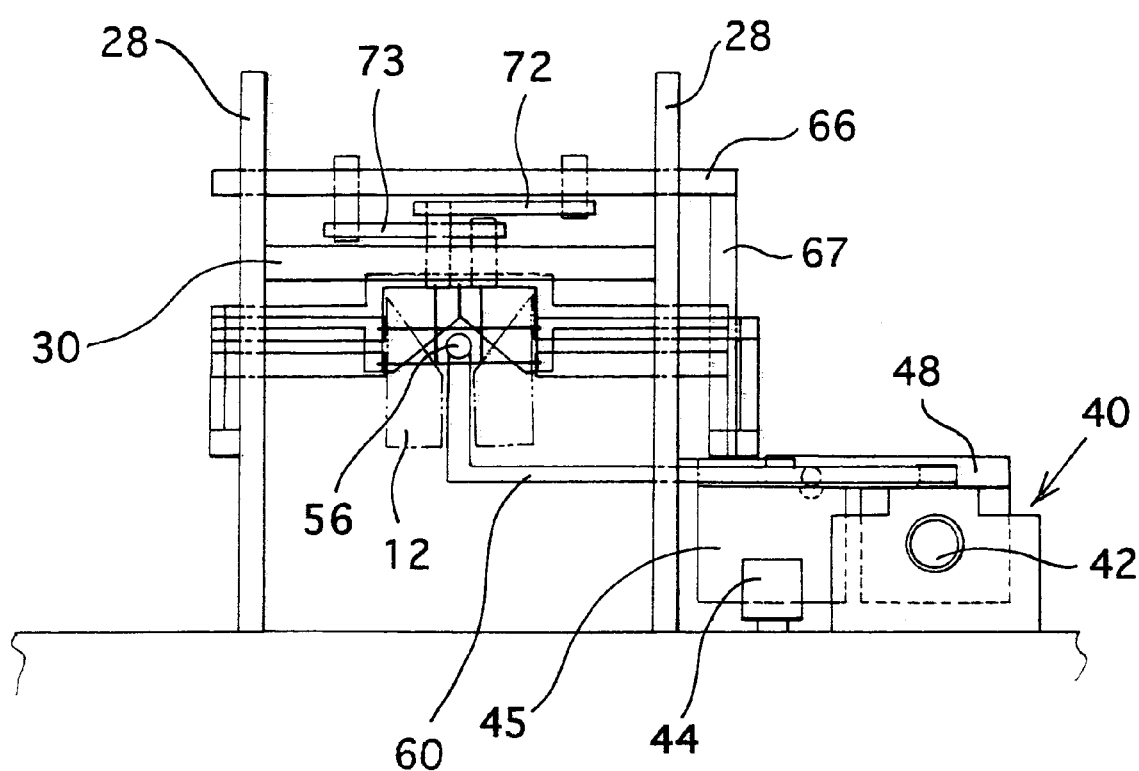
FIG. 9 is a front view of the vegetable block chamfering machine of FIG. 7.
Figure 10:
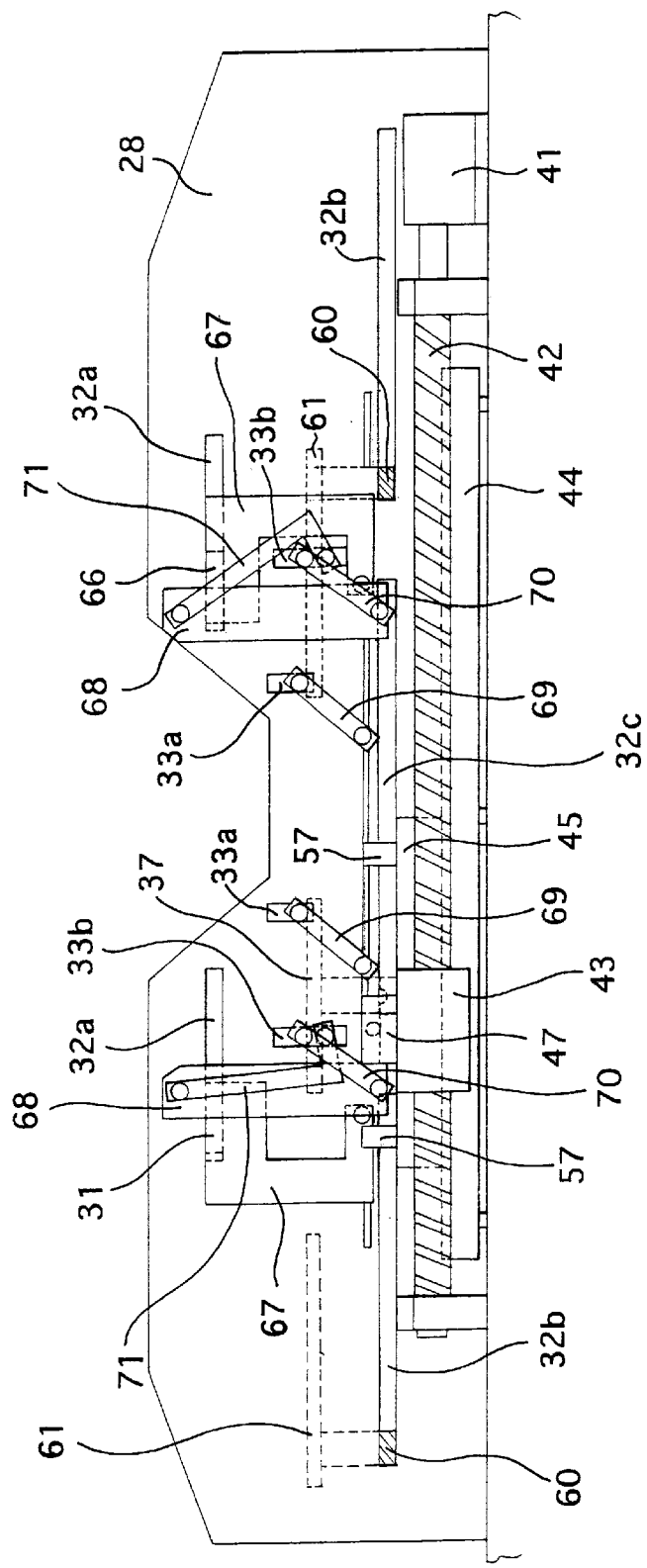
FIG. 10 is a side view of the vegetable block chamfering machine of FIG. 7.

FIG. 5 shows how the edges C of the upper and lower chamfering blades 21 and 22 change in angle relative to an elongated cuboid block of vegetable such as a potatoes, which is ahead of their edges C (their backs indicated by D). As seen from FIG. 6, a piece of potatoes (FIG. 6-1) is cut at opposite ends (solid lines, in FIG. 6-2) and then, in radial directions (broken lines in FIG. 6-2) into an elongated cuboid block of potato B (FIG. 6-3).

When the lateral handle extension 9 is pulled toward a user (leftward in FIG. 1) to move the front movable wall 5 forward, the rear movable wall 6 is moved forward accordingly, thereby allowing the longitudinal push-extension 8 to push the slider block 23 forward. Accordingly the swingable rod 16 is formed to swing clockwise until the slider block 23 abuts against the detent 26b, and then the swingable rod 16 and the rear movable wall 6 stop.

As the upper blade raising-and-lowering connection rod 17 is formed to swing clockwise, the upper blade axle 19 is lowered in the vertical guide slot 14, permitting the edge of the upper chamfering blade 21 to be inclined upward relative to the elongated cuboid block of vegetable B.

At the same time, the lower blade lowering-and-raising connection rod 18 is formed to swing counterclockwise to raise the lower blade axle 20 in the vertical guide slot 14, thereby permitting the edge of the lower blade 22 to be inclined downward relative to the elongated cuboid block of vegetable B.

The lateral handle extension 9 is pulled toward the user even more to expand the distance between the confronting push rods 4 and 4, and then a selected elongated cuboid block of vegetable is placed on the "V"-shaped groove 12a of the vegetable carrier 12 in the expanded space between the confronting push rods 4 and 4. Then, the lateral handle extension 9 is released to allow the confronting longitudinal push rods 4 and 4 to pinch the elongated cuboid block of vegetable therebetween (see FIG. 1).

Then, the lateral handle extension 9 is pushed rearward (rightward in FIG. 1) to allow the longitudinal push-extension 7 of the front movable wall 5 to push the slider block 23 rearward along with the elongated cuboid block of vegetable B.

The lengths of the confronting push rods 4 and 4 are so determined that the elongated cuboid block of vegetable B may be placed in contact with the edges of the upper and lower blades 21 and 22 when the longitudinal push-extension 7 of the front movable wall 5 abuts against the slider block 23.

Immediately after the block of vegetable B abuts against the upper and lower chamfering blade edges, the upper blade raising-and-lowering connection rod 17 puts the edge of the upper chamfering blade 21 in an upward oblique position whereas the lower blade lowering-and-raising connection rod 18 puts the edge of the lower chamfering blade 22 in a downward oblique position (see FIG. 5, ST-1).

Further pushing of the lateral handle extension 9 moves the slider 23 rearward to rotate the swingable rod 16 counterclockwise about the pivot axle 15 from the position indicated by solid lines toward that indicated by broken lines in FIG. 1.

While the upper blade raising-and-lowering connection rod 17 rotates about the joint 25 toward the upright position, the upper blade axle 19 is raised in the vertical guide slot 14, allowing the upper blade 21 to chamfer the end of the vegetable block B. As the upper blade axle 19 turns, the edge of the upper chamfering blade changes gradually in angle from the upward oblique to horizontal position to slice the top of the vegetable block B horizontally.

On the other hand, while the swingable rod 16 pushes down the lower blade lowering-and-raising connection rod 18, the lower blade axle 20 is lowered in the vertical guide slot 14, permitting its edge to turn gradually from the downward oblique to horizontal position to slice the bottom of the vegetable block B horizontally.

The joint 25 between the swingable rod 16 and the upper blade raising-and-lowering connection rod 17 is allowed to move in the vertical slot 27 of the slide block 23 while the swingable rod 16 swings a certain angular distance about the pivot axle 15, thereby assuring that the swingable rod 16 along with both connection rods 16 and 17 move smoothly. When the swingable rod 16 comes to the upright position, the upper chamfering blade 21 is raised up to the highest position with its edge horizontal, and the lower blade 22 is lowered down to the lowest position with its edge horizontal (see FIG. 5, ST-2).

When the swingable rod 16 swings rightward beyond the upright position, the upper blade raising-and-lowering connection rod 17 lowers the upper blade 21, allowing its edge to turn downward, and the lower blade lowering-and-raising connection rod 22 raises the lower blade 22, allowing its edge to turn upward (see FIG. 5, ST-3).

When the slider block 23 abuts against the detent 26a, the swingable rod 16 stops, and it is retained in the position shown in phantom lines in FIG. 1. The chamfering of the block of vegetable B is finished.

Guide plates 13a, 13b, upper blade raising-and-lowering connection rods 16, lower blade lowering-and-raising connection rods 18 of different sizes are prepared, and selectively used to meet different vegetable block sizes and shapes.

When the vegetable carrier means 3 moves a certain predetermined distance, the trapezoid-like upper chamfering blade 21 cuts and removes the top of the vegetable block B, and at the same time, the linear lower blade 22 cuts and removes the bottom of the vegetable block B.

As the vegetable block B is brought a distance equal to its longitudinal size, the upper and lower blades 21 and 22 change their angles gradually so that the vegetable block B may be cut and shaped as seen from FIG. 6-4.

After finishing the chamfering of the vegetable block, the rear movable wall 6 is withdrawn rearward to allow the chamfered vegetable block to fall. While chamfering, vegetable debris is allowed to fall, so that the finished vegetable block may be free of such vegetable debris.

After removing the finished vegetable block from the machine, the front movable wall 5 is allowed to return to the initial position by releasing the lateral handle extension 9, and at the same time the rear movable wall 6 is pulled toward the front movable wall 5 by the stretched spring 24.

The slider block 23 is pushed forward by the longitudinal push-extennsion 8 of the rear movable wall 6, allowing the swingable rod 16, the upper blade raising-and-lowering connection rod 17 and the lower blade lowering-and-raising connection rod 18 to return to their initial positions as shown in solid lines in FIG. 1.

In this particular example the vegetable carrier means 3 is moved by hand. The machine may be so designed that the vegetable carrier means 3 may be moved through the agency of an electric motor driven rack-and-pinion, and then, a lot of vegetable blocks can be chamfered one after another simply by putting them on the vegetable carrier 12, permitting time and labor to be saved.

Referring to FIGS. 7 to 22, a chamfering machine according to a second embodiment of the present invention is described below. The machine is so designed that blocks of vegetable may be shifted alternately in the opposite directions to be chamfered one after another.

A longitudinal vegetable-feeding passage M is defined on the flat base of the machine, and two opposite side plates 28 stand upright on either side of the longitudinal vegetable passage M with two lateral support plates 30 traversing the space between the opposite side plates 28 on the front and rear sides of the machine. These make up together a machine frame 29.

Each side plate 28 has upper and lower longitudinal, horizontal guide slots 32a, 32b, 32c or 32d, and vertical guide slots 33a and 33b.

The lateral support plate 28 is positioned at a level lower than the upper longitudinal slot 32a, and it has a lateral guide slot 31.

A vegetable carrier 12 is placed at the intermediate position of the machine frame 29.

The vegetable carrier 12 is composed of a pair of chamfered blocks, which are arranged with their chamfered sides facing each other, thereby defining a "V"-shaped groove 12a therebetween. The opposite chamfered blocks are somewhat apart from each other, leaving a longitudinal gap of predetermined width on the bottom of the "V"-shaped valley.

Each chamfered block has a through hole formed therein. A light-emitting element is placed on one side of one of the opposite chamfered blocks and a light-receiving element is placed on the other side of the other chamfered block, so that a block of vegetable B may be detected when it is placed on the vegetable carrier 12.

Figure 11:
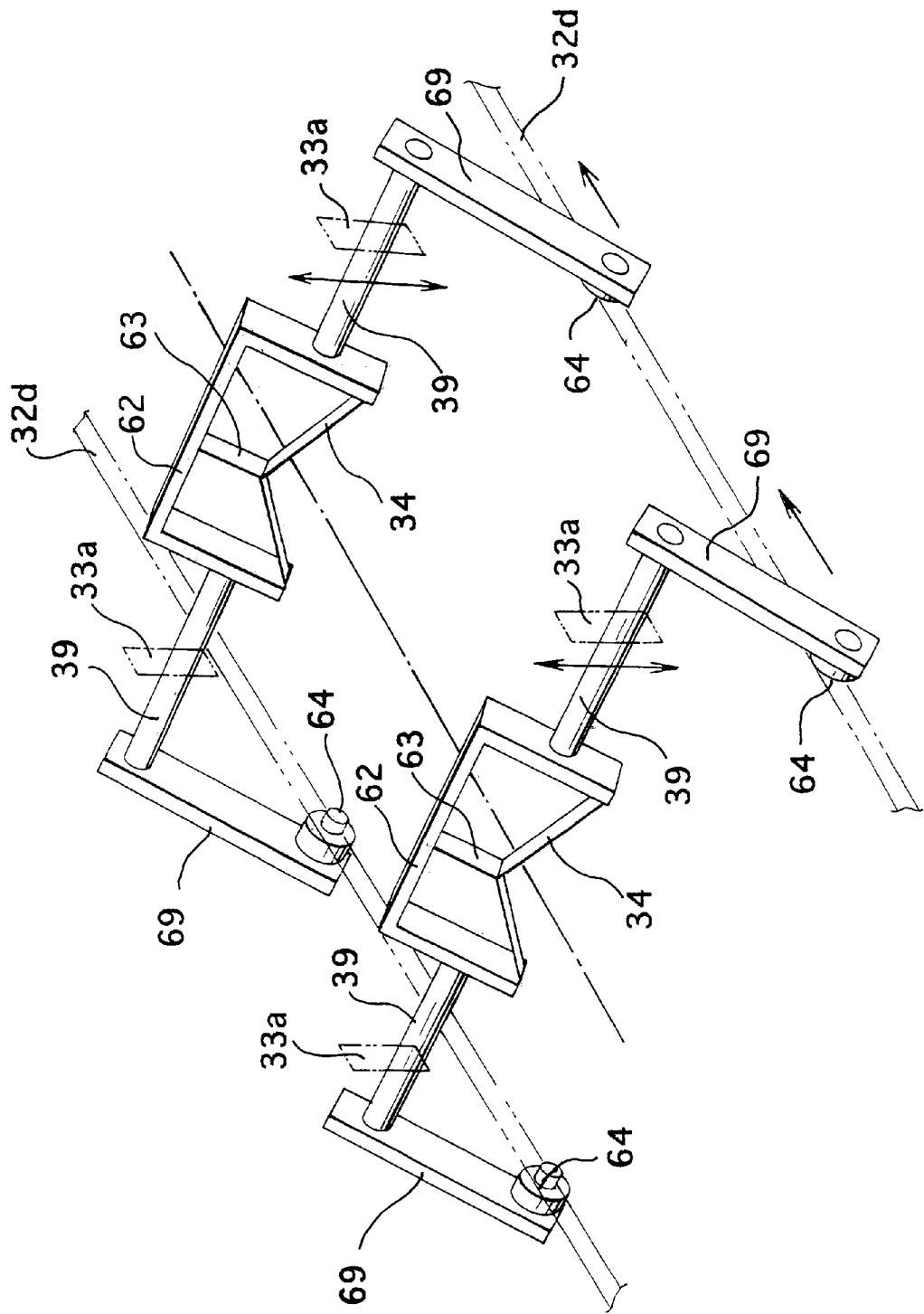
FIG. 11 is a perspective view of two inverted "V"-shaped chamfering blades for cutting and removing the opposite upper corner ridges of the vegetable block.

Two inverted "V"-shaped blades 34 are arranged on the front and rear sides of the vegetable carrier 12, and their blade axles 39 are slidably fitted in vertical guide slots 33a, which are formed in the opposite side walls 28 (see FIG. 11).

Figure 12:
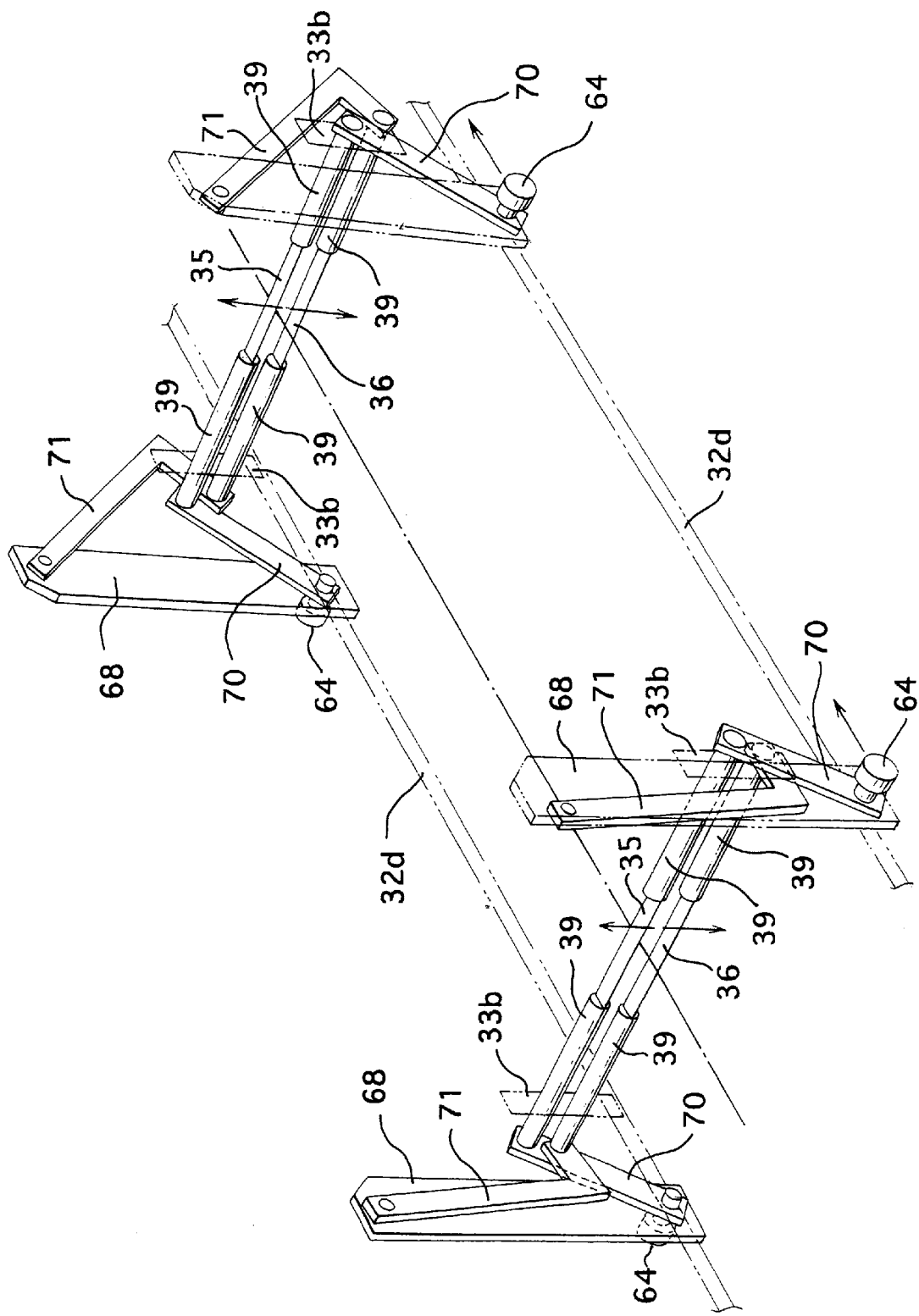
FIG. 12 is a perspective view of two horizontal chamfering blades for cutting and removing the top and bottom portions of the vegetable block.

Two pairs of upper and lower horizontal chamfering blades 35 and 36 have their axles 39 slidably fitted in the vertical guide slots 33b, which are formed in the opposite side walls 28 (FIG. 12).

Figure 13:
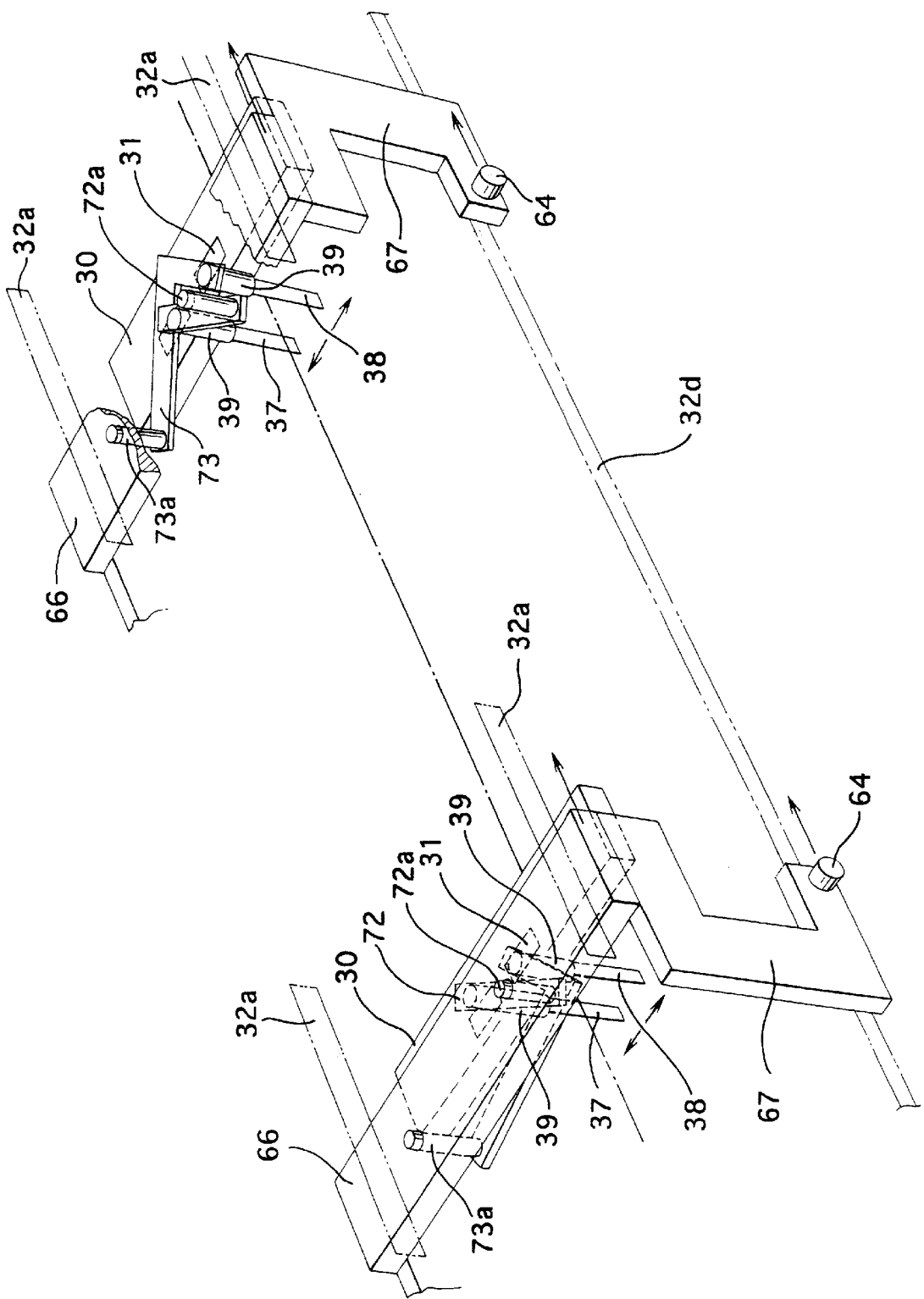
FIG. 13 is a perspective view of two vertical chamfering blades for cutting and removing the opposite sides of the vegetable block.

Finally, two pairs of left and right vertical blades 37 and 38 have their axles 39 slidably fitted in the horizontal guide slots 31, which are formed in the lateral support plates 30 (FIG. 13).

The inverted "V"-shaped blades 34 for cutting and removing the opposite longitudinal corners of an elongated cuboid block of vegetable, upper and lower horizontal blades 35, 36 for cutting and removing the top and bottom of the vegetable block, and left and right vertical blades 37, 38 for cutting and removing the opposite sides of the vegetable block are separated into two groups with their edges directed to the vegetable carrier 12.

A slider system 40 comprises a screw rod 42 extending parallel to the longitudinal vegetable-feeding passage M and a slider block 43 threadedly engaged with the screw rod 42. The screw rod 42 is connected to the shaft of an electric motor 41. The slider system 40 has a reversing switch (not shown) positioned at either end, too. When the reversing switch is actuated to permit the motor 41 to run in one or the other direction, the slider block 43 is moved back and forth within a predetermined distance.

An elongated guide rail 44 is laid parallel to the vegetable-feeding passage M, extending along the two side walls 28 on one side of the flat bed of the machine frame, and a liner 45 is slidably mounted on the longitudinal guide rail 44.

Referring to FIGS. 18 to 21, the slider block 43 has a projected joint plate 48 fixed to its top, and the projected joint plate 48 has its projection 47 laid on the liner 45.

The projection 47 has an engagement hole 49 formed for accommodating a steel ball 50 and a coiled spring 51 whereas the liner 45 has a counter semicircular-hole 52 formed thereon, thus providing a detachable engagement mechanism 46 by which the projected joint plate 48 is detachably connected to the liner 45 by allowing the steel ball 50 to be fitted in the blind hole 52 under the influence of the coiled spring 51.

The guide rail 44 has two detents 533 and 544 projecting at its opposite ends for defining the range within which the liner 45 can be driven.

The slider block 43 can be moved beyond the range set for the liner 45 when the steel ball 50 leaves the blind hole 52, thereby disengaging the slider block 43 from the liner 45. The slider block 43 can be placed in engagement with the liner 45 when the slider block 43 enters the range set for the liner 45 again, allowing the steel ball 50 to drop in the blind hole 52.

The liner 45 has a lateral extension 55 movably fitted in the longitudinal, horizontal guide slot 32c of the side wall 28, and a longitudinal push rod 56 is integrally connected to the lateral extension 55 of the liner 45.

Figure 22:
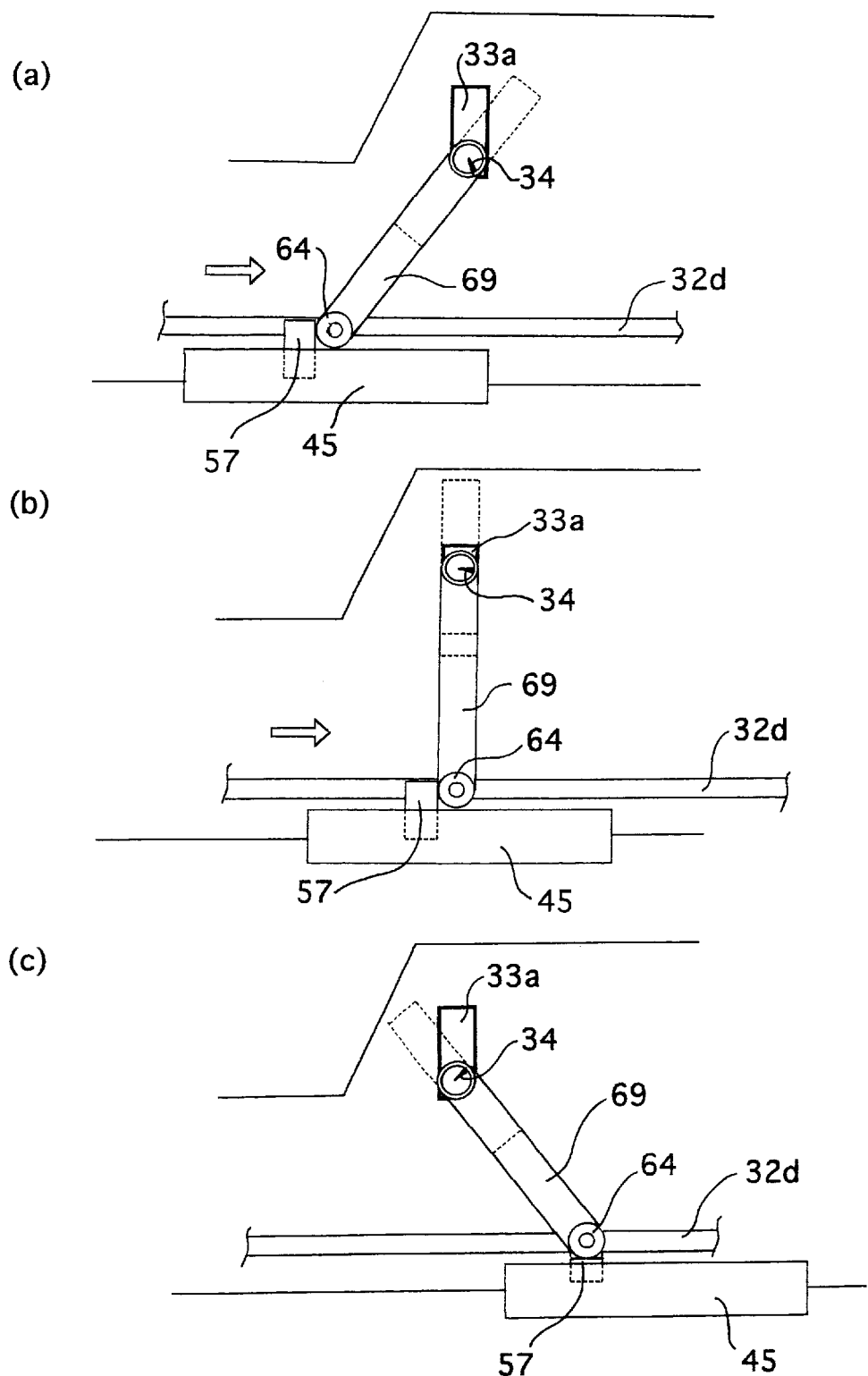
FIG. 22 illustrates how the swingable rod is operatively connected to an actuating pin.

The liner 45 has an actuator pin 57 depressibly projecting from its top (see FIG. 22).

Figure 18:
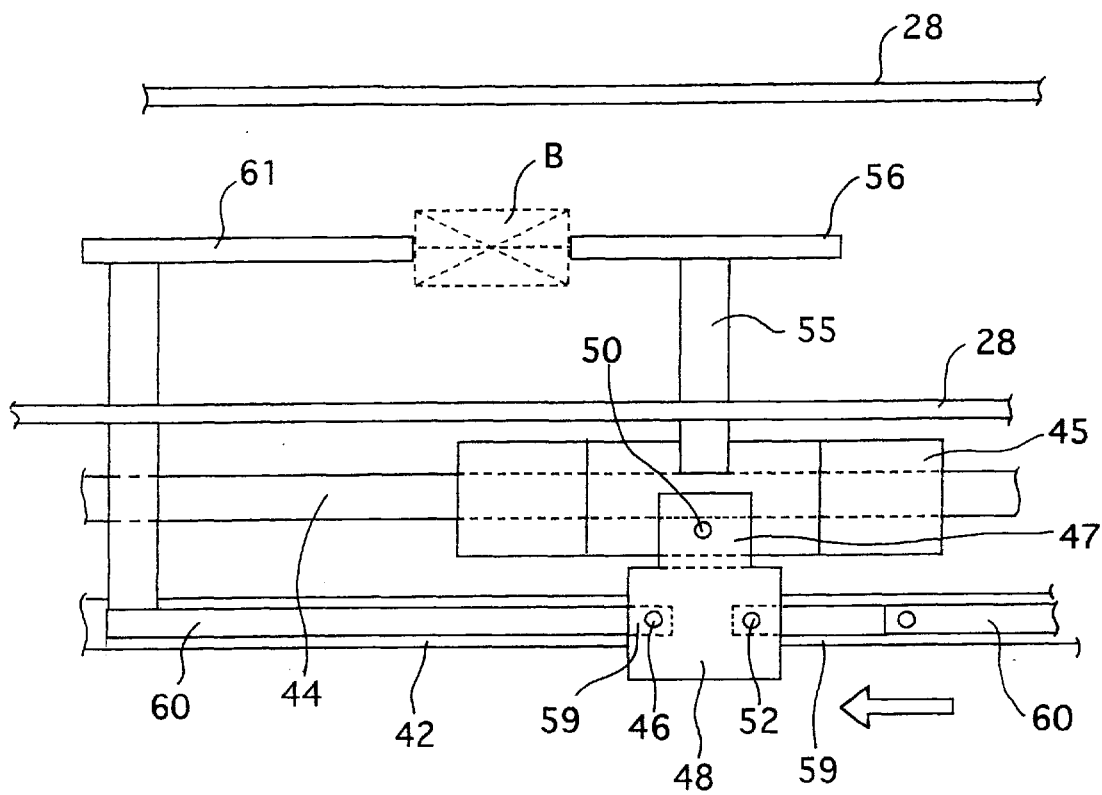
FIG. 18 is a plane view of some parts of the vegetable chamfering machine for pinching and holding a cuboid block of vegetable B.
Figure 19:
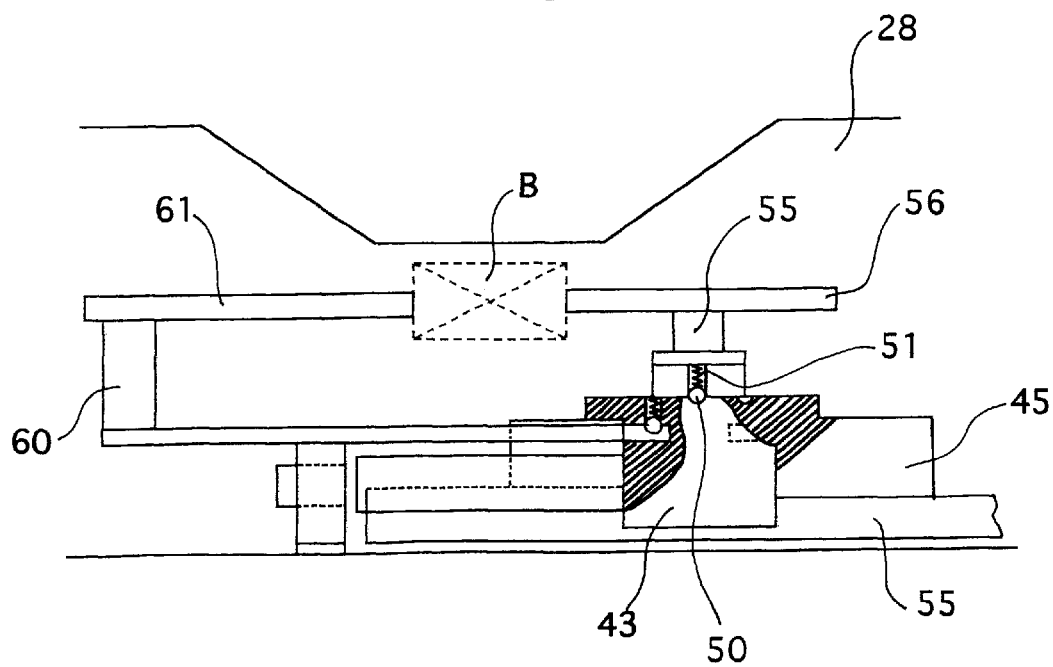
FIG. 19 is a side view of some parts for pinching and holding a cuboid block of vegetable B.

Referring to FIGS. 18 and 19, the slider block 43 has square joint holes 59 formed in its opposite sides. These square joint holes 59 extend parallel to the screw rod 42, and the slider block 43 has detachable engagement means 46 equipped therewith. The detachable engagement means 46 can be operatively accommodated in the square joint holes 59.

The longitudinal extensions of two L-shaped plates 60 are so arranged along the longitudinal guide rail 44 on the opposite sides of the slider block 43 that the end of each longitudinal extension may be aligned with one or the other square joint hole 59 of the slider block 43, thus permitting the end of each longitudinal extension to be inserted in the square joint hole 59 and detachably caught by the detachable engagement means 46. The lateral extension of the L-shaped plate 60 is movably inserted in the longitudinal guide slot 32b of the side wall 28, and it has a counter push rod 61 integrally connected to its end in confronting relation with the push rod 56.

Again referring to FIG. 11, the inverted "V"-shaped chamfering blade 34 comprises an inverted "Y"-shaped blade section and a "U"-shaped frame 62, and the inverted "Y"-shaped blade section is integrally connected to the blade axle 39 via the "U"-shaped frame 62. The "I"-shaped blade section 63 which connects the ridge of the inverted "V"-shaped blade section to the inverted "U"-shaped frame 62 functions to cut and separate a slice of vegetable into two pieces. The edge of the inverted "Y"-shaped blade section is in the plane in which the center axis of the blade axle 39 is contained, and the joint between the inverted "V"-shaped blade section and the "I"-shaped blade section is preferably at a level which is somewhat higher than the center axis of the blade axle 39.

The blade axle 39 has two swingable rods 69 fixed to its opposite ends. Each swingable rod 69 has a roll 64 fixed to its lower end. The roll 64 has its axle 65 movably fitted in the longitudinal guide slot 32d of the side wall 28, and the roll 64 confronts one or the other actuator pin 57 of the liner 45.

Referring to FIG. 22 again, the liner 45 has an electromagnet (not shown) contained therein for pulling the actuator pin 57 in the liner 45, thereby allowing the liner 45 to pass under the roll 64 of the swingable rod 69, and then, the actuator pin 57 is allowed to appear again from the top surface of the liner 45.

Referring to FIG. 12, the upper horizontal chamfering blade 35 is integrally connected to the blade axle 39 with its edge inclined somewhat upward whereas the lower chamfering blade 36 is integrally connected to the blade axle 39 with its edge inclined somewhat downward. The blade axle 39 of the upper blade 35 has two swingable rods 70 fixed to its opposite ends whereas the blade axle 39 of the lower blade 36 has two swingable rods 71 fixed to its opposite ends.

Two actuator plates 68 for each set of upper and lower horizontal blades 35 and 36 are provided outside of the opposite side walls 28. Each swingable rod 70 of the upper horizontal blade 35 is operatively connected to the actuator plate 68 and the side wall 28 by fixing the axle of the roll 64 to the lower end of the swingable rod 70, inserting the roll axle loosely in the hole of the lower end of the actuator plate 68, and inserting the roll axle loosely in the longitudinal guide slot 32d of the side wall 28.

The upper end of each swingable rod 71 of the lower horizontal blade 36 is rotatably fixed to the upper end of the actuator plate 68.

Referring to FIG. 13, the left and right vertical chamfering blades 37 and 38 are integrally connected to the vertical blade axles 39 with their edges directed somewhat outward, and the vertical blade axles 39 are fixed to the horizontal swingable rods 72 and 73. A horizontal slide plate 66 has a traversing guide slot 31 formed therein, and the opposite ends of the horizontal slide plate 66 are slidably inserted in the longitudinal, horizontal guide slots 32a of the opposite side walls 28. An upright slide plate 67 is fixed to one end of horizontal slide plate 66, which appears from the side wall 28.

The vertical blade axles 39 are slidably fitted in the traversing guide slot 31 of the horizontal slide plate 66, and the swingable rods 72 and 73 are rotatably fixed to the horizontal slide plate 66 via associated joint pins 72a and 73a.

The upright slide plate 67 has a roll 64 fixed to its lower end, and the axle 65 of the roll 64 is movably inserted in the longitudinal guide slot 32d of the side wall 28.

FIGS. 18 and 19 show that an elongated cuboid block of vegetable B is pinched and held between the push and counter push rods 56 and 61.

When the slider block 43 is driven in the direction indicated by arrow in FIG. 18 to placed the center of the slider block 43 in alignment with the center of the liner 45, the slider block 43 is coupled with the liner 45 by the engagement mechanism 46, and then the slider block 43 and the liner 45 move together as a whole, allowing the lateral extension 55 of the liner 45 to move in the longitudinal slot 32c of the side wall 28, so that the push rod 56 may push the block of vegetable B forward.

On the other hand, the lateral extension of the L-shaped plate 60 remains still, lying ahead of the slider block 43. When the slider block 43 continues to move toward the confronting end of the longitudinal extension of the L-shaped plate 60 to allow it to enter the square joint hole 59 of the slider block 43, the L-shaped plate 60 is coupled with the slider block 43, and then, the block of vegetable B is pinched and held between the push rod 56 and the counter push rod 61. The L-shaped plate 60 is caught by detent means (not shown) to permit it to stay at a predetermined position against the pressure applied by the slider block 43, thereby assuring that the block of vegetable B be held positively.

Referring to FIG. 22, the liner 45 is driven rearward, permitting the actuator pin 57 to push the roll 64, thereby rotating the swingable rod 69 counterclockwise to raise the blade axle of the inverted "V"-shaped chamfering blade 34 in the vertical guide slot 33a. After the swingable rod 69 passes the upright position as shown in FIG. 22(b), the inverted "V"-shaped chamfering blade 34 starts descending.

The swingable rod 69 is rotated a predetermined angular distance to allow the "V"-shaped chamfering blade 34 to cut and remove the top of the vegetable block B, reaching the position as shown in FIG. 22(c), when photo sensor means (not shown) detects arrival of the swingable rod 69 at the position to de-energize the electromagnet means, thus allowing the actuator pin 57 to be depressed in the liner 45 under the influence of spring.

Thereafter, the liner 45 continues to move rearward, allowing the roll 64 to ride over the depressed actuator pin 57 (see FIG. 22(c)), and leaving the swingable rod 69 behind.

Figure 14:
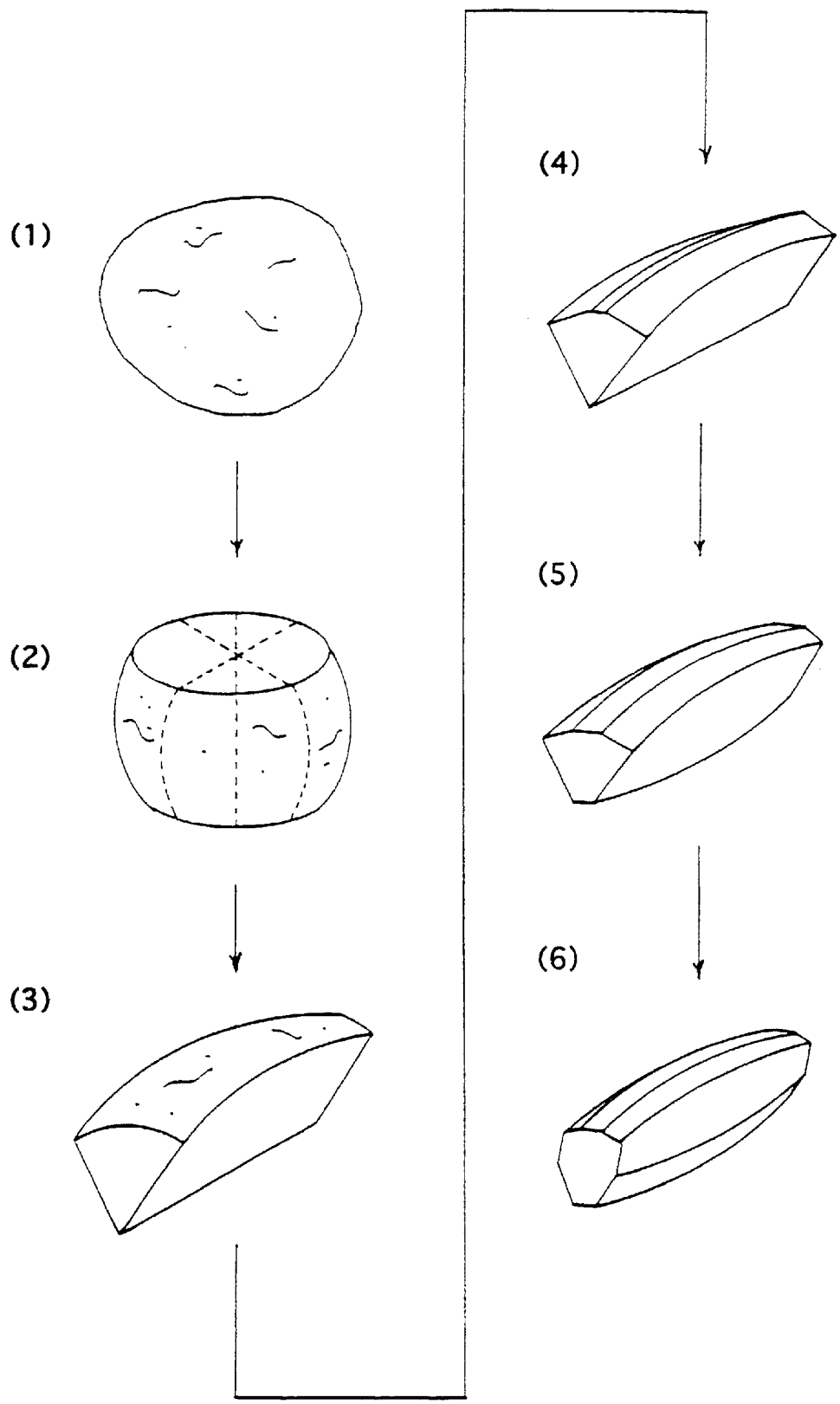
FIG. 14 shows how a piece of vegetable is cut into a cuboid block of vegetable, and how the cuboid block of vegetable is chamfered by the vegetable block chamfering machine of FIG. 7.

The top of the block of vegetable B is cut and removed by the inverted "V"-shaped blade 34 (see FIG. 14(4)), and then, the top slice is cut into two separate pieces, which can be removed from the chamfering machine without being caught by any parts of the machine.

The liner 45 moves rearward beyond the position as shown in FIG. 22(c), and then, the electromagnet means is energized to project the actuator pin 57 from the top surface of the liner 45.

The liner 45 continues to move rearward, so that the actuator pin 57 abuts against the subsequent roll 64 to push it, thereby rotating the swingable rod 70 and raising the horizontal, upper chamfering blade 35, and at the same time, lowering the horizontal, lower chamfering blade 36.

After slicing the upper and lower portions of the vegetable block B with the upper and lower horizontal blades (see FIG. 14(5)), rotation of the swingable rod 70 over a predetermined angular distance is detected by an associated photo sensor (not shown) to de-energize the electromagnet, thereby allowing the actuator pin 57 to be depressed in the liner 45. Thus, the roll 64 rides over the depressed actuator pin 57.

After the roll 64 passes the depressed actuator pin 57, the electromagnet is energized to allow the actuator pin 57 to appear on the top surface of the liner 45.

Finally, the roll 64 of the left and right vertical blades 37 and 38 is pushed rearward by the actuator pin 57, thereby pushing the horizontal slide plate 66 rearward via the upright plate 67 to allow the left and right vertical chamfering blades 37 and 38 to move horizontally in the traversing guide slot 31.

When the upright plate 67 stops at the terminal end of the longitudinal guide slot 32a, the photo sensor detects arrival at the terminal position for de-energizing the electromagnet. The roll 64 is allowed to ride over the depressed actuator pin 57, so that the liner 45 moves rearward, leaving the roll 64 behind, and finally the liner 45 stops when it abuts against the detent 53b.

On the other hand, the slider block 43 continues to move rearward, leaving the liner 45 behind, and the L-shaped rod 60 is pushed rearward to expand the space between the push rod 56 and the counter push rod 61 until the chamfered block of vegetable B may fall down.

The manner in which the actuator pin and the link mechanism work with unison is described below in respect to the inverted "V"-shaped blade 34.

The slider block 43 is driven forward, and the liner 45 is coupled with the slider block 43, and is driven together with the slider block 43. The push rod 56 of the liner 45 pushes an elongated cuboid block of vegetable B, making it to leave the vegetable carrier 12 so that it is pinched and held between the push rod 56 and the counter push rod 61.

The liner 45 continues to move forward, pushing the roll 64 of the swingable rod 69 with the actuator pin 57 to allow the upper end of the swingable rod 69 to rise in the vertical guide slot 33a. Accordingly the inverted "V"-shaped blade 34 rises with its edge turning accordingly, thereby cutting the top of the vegetable block B in a triangular shape.

When the swingable rod 69 stands upright to be aligned with the vertical guide slot 33a, the inverted "V"-shaped blade 34 is raised up to the highest position in which the edge is directed horizontal.

When the liner 45 continues to move forward, the inverted "V"-shaped blade 34 is lowered while allowing the blade edge to turn downward. Thus, the vegetable block B is chamfered to be given a triangular shape in cross section.

Figure 20:
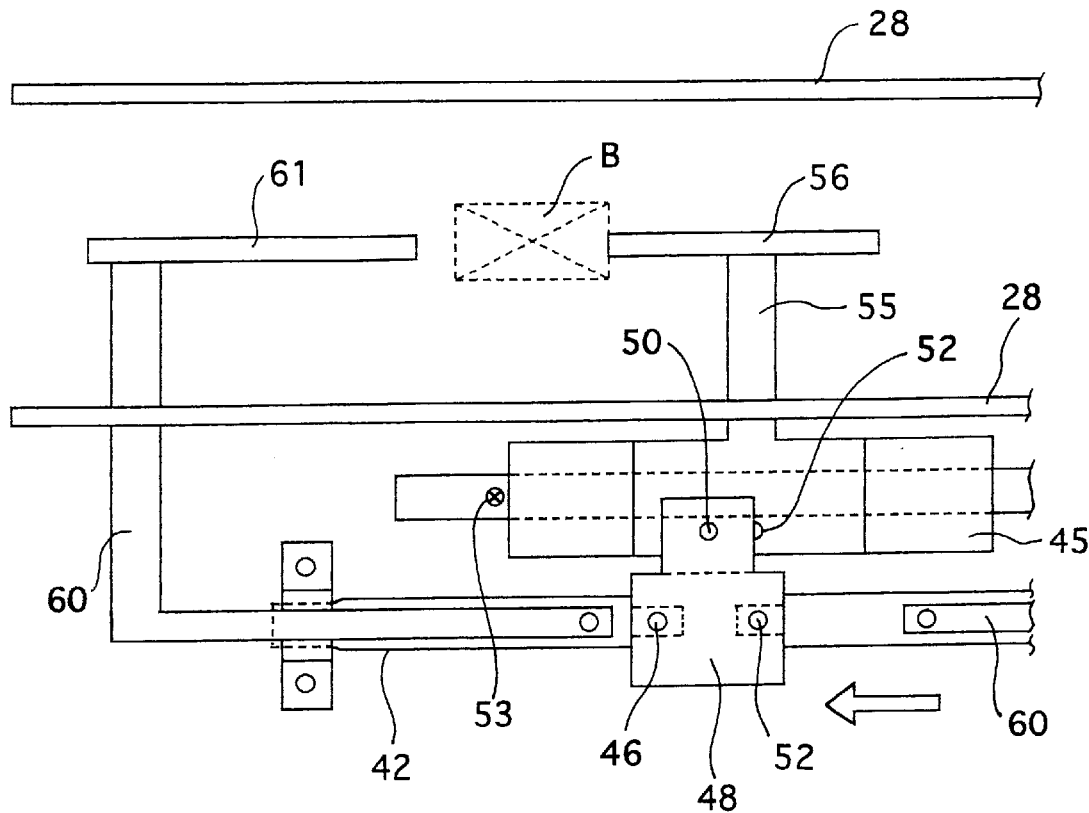
FIG. 20 is a plane view of vegetable block pinching-and-holding parts in the state of discharging a chamfered block of vegetable B.
Figure 21:
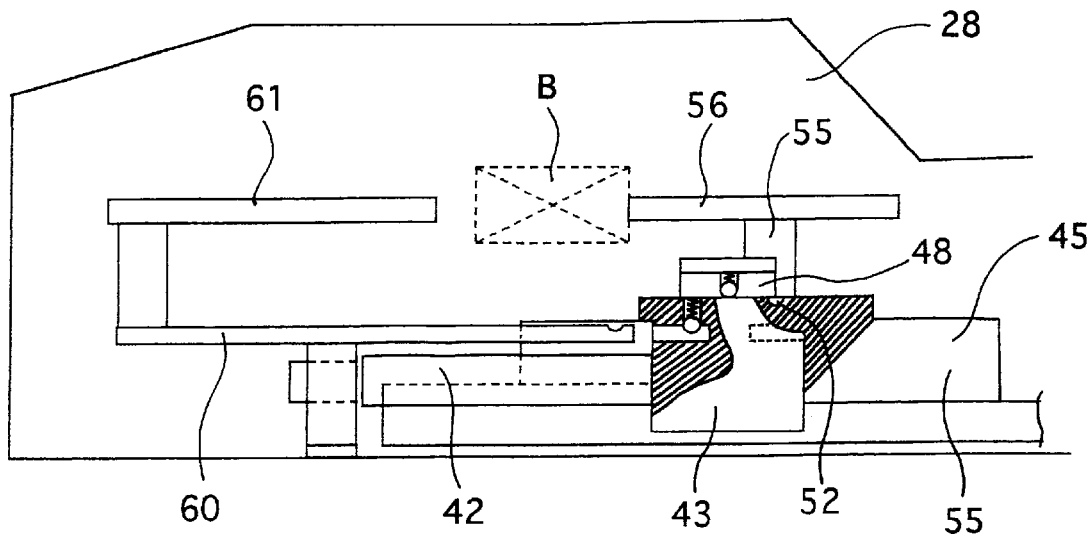
FIG. 21 is a side view of vegetable block pinching-and-holding parts in the state of discharging the chamfered block of vegetable B.

FIGS. 20 and 21 show how the chamfered vegetable B is discharged.

The slider block 43 continues to move, and the liner 45 abuts against the detent pin 53b, so that the slider block 43 is disengaged from the liner 45 to allow only the slider 43 to continue to move while pushing the counter push rod 61 apart from the chamfered vegetable block B. Thus, the chamfered vegetable block B is allowed to fall down.

After the chamfered vegetable block B is discharged, the screw rod 42 turns in the opposite direction to drive the slider block 43 along with the L-shaped plate 60 in the opposite direction. When the L-shaped plate 60 abuts against the detent 54b to stop there, the slider block 43 is disconnected from the L-shaped plate 60, and then, the slider block 43 is coupled with the liner 45 to permit the liner 45 to move together with the slider block 43.

As the liner 45 moves rearward, the actuator pin 57 of the liner 45 pushes the roll 64 of the upright slide plate 67, the roll 64 of the actuator plate 68 and the roll 64 of the swingable rod 69 rearward in the order named to bring all of them in their initial position in which the left and right, vertical chamfering blades 37 and 38, the upper and lower, horizontal chamfering blades 35 and 36 and the inverted "V"-shaped blade 34 are so oriented that their edges are directed to the vegetable carrier 12.

FIG. 14 shows how an elongated cuboid block of vegetable B can be chamfered sequentially.

At the preliminary step (see FIG. 14(1) to (3)) a piece of potatoes is cut at its opposite sides, and the barrel-like piece of potatoes is cut radially into four or six equal blocks B without their skin peeled. The preliminary treatment can be performed automatically by using an automatic cutter, which is disclosed in Japanese Utility Model Registration No.3024160.

An elongated cuboid block of vegetable B (FIG. 14(3)) is laid on the vegetable carrier 12 with its triangular ridge down.

The block of vegetable is chamfered along its opposite shoulders with the inverted "V"-shaped blade to give it such a shape as shown in FIG. 14(4).

The block of vegetable is sliced along its upper and lower portions with the upper and lower, horizontal blades 35 and 36 to give it such a shape as shown in FIG. 14(5).

Finally, the block of vegetable is cut along its opposite sides with the left and right, vertical chamfering blades 37 and 38 to give it such a shape as shown in FIG. 14(6).

Figure 15:
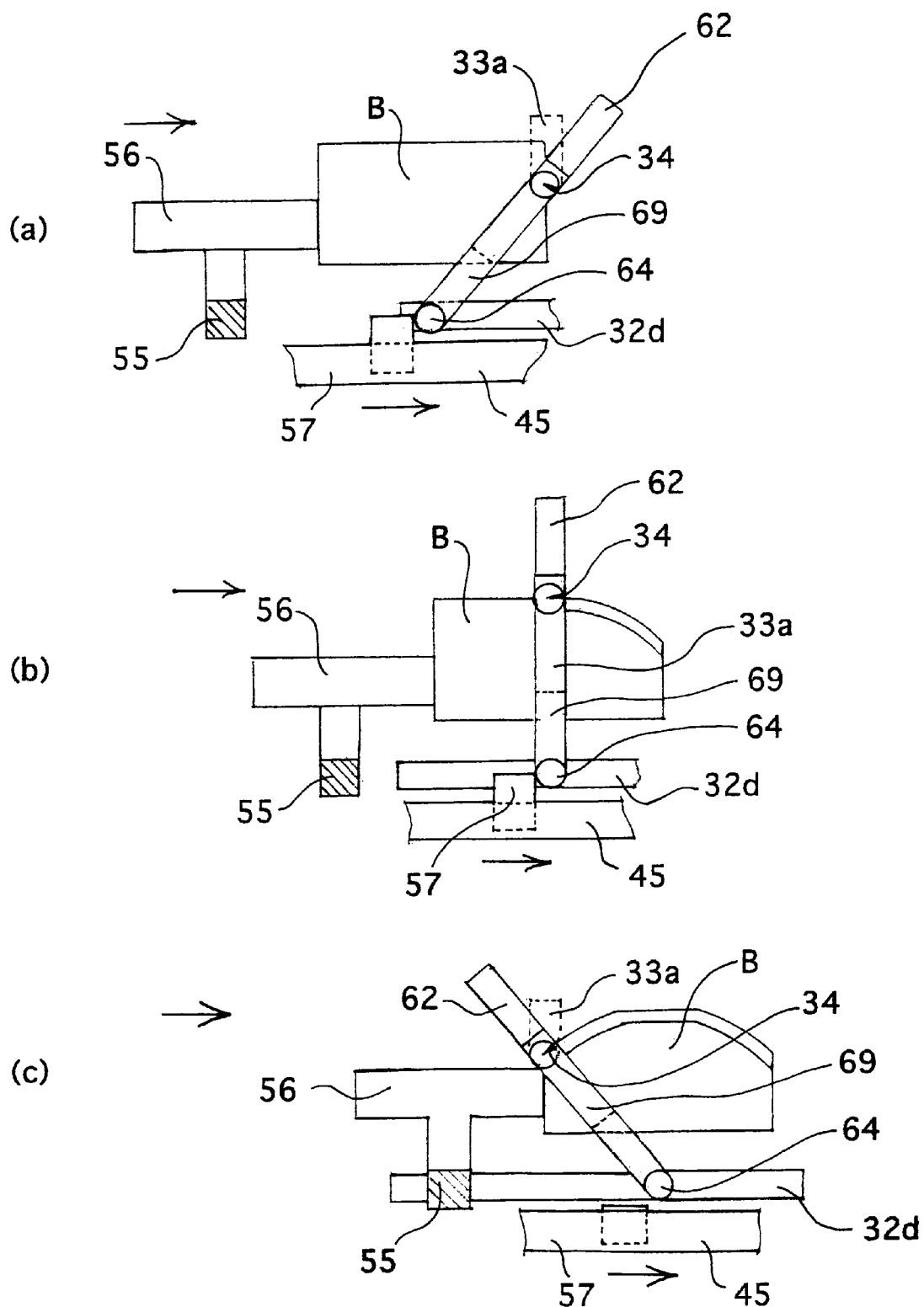
FIGS. 15 to 17 show how these different chamfering blades work.
Figure 16:
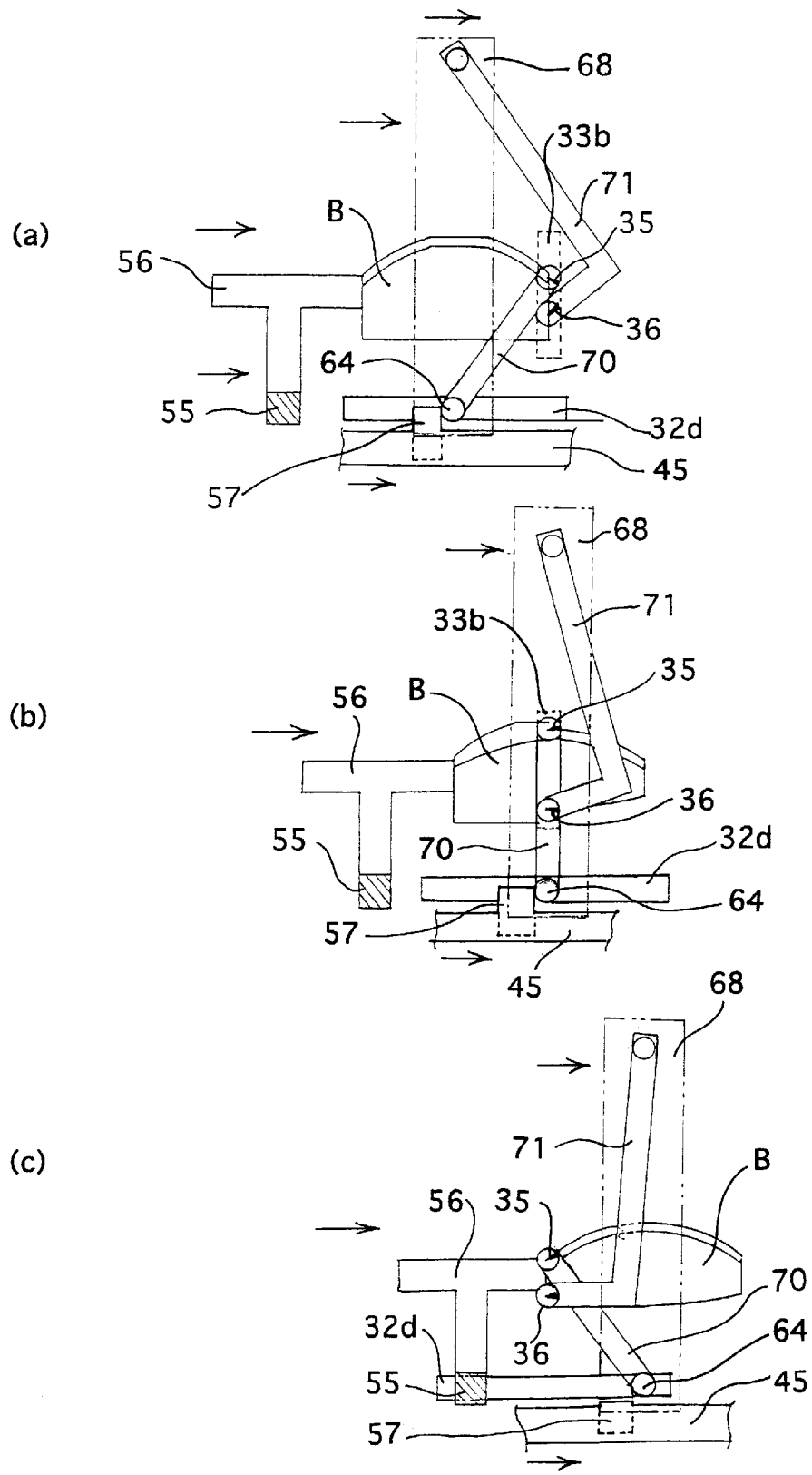
Figure 17:
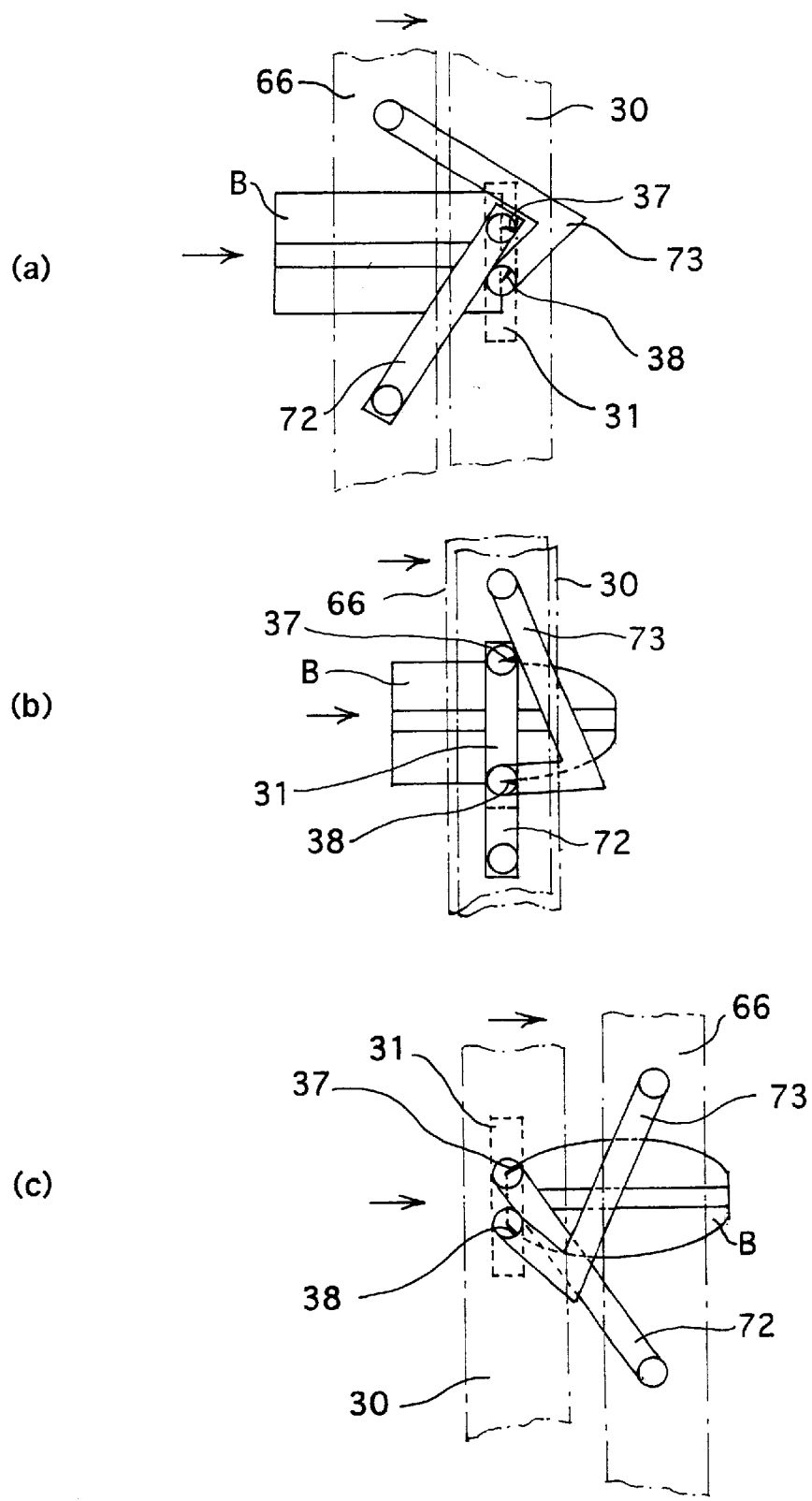

FIGS. 15 to 17 show how the different chamfering blades work.

Referring to FIG. 15, the push rod 56 pushes an elongated cuboid block of vegetable B, and at the same time, the liner 45 is driven to push the roll 6 of the swingable rod 69, thereby raising the inverted "V"-shaped blade gradually while its edge is allowed to turn from upward-inclined to horizontal position, and then the swingable rod 69 stands upright (see FIG. 15b).

The roll 64 of the swingable rod 69 is pushed still further to make the swingable rod 69 to incline in the opposite way, lowering the inverted "V"-shaped blade 34 to allow its edge to be directed obliquely downward. The actuator pin 57 is depressed in the liner 45, thus permitting the roll 64 of the swingable rod 69 to ride over the depressed actuator pin 57 (see FIG. 15c).

Referring to FIG. 16, the push rod 56 continues to push the block of vegetable B until it abuts against the upper and lower, horizontal blades 35 and 36 (FIG. 16a). The liner 45 is driven to push the roll 64 rearward, thereby permitting the swingable rods 70 and 71 to raise the upper horizontal blade 35 and lower the lower horizontal blade 36 along the vertical guide slot 33b, allowing their edges to turn gradually to the horizontal position (see FIG. 16b).

The liner 45 is driven to make the edges of the upper and lower, horizontal blades 35 and 36 turn inward, when the actuator pin 57 is depressed in the liner 45, thereby permitting the roll 64 of the swingable rod 69 to ride over the depressed actuator pin 57 (see FIG. 16c).

Referring to FIG. 17, the push rod 56 continues to push the block of vegetable B until it abuts against the left and light, vertical blades 37 and 38 (FIG. 17a).

The liner 45 is driven to push the slide plate 68 rearward, thereby permitting the swingable rods 72 and 73 to move the left and right, vertical blades 37 and 38 apart from each other, allowing their edges to turn gradually from the divergent to parallel position (see FIG. 17b).

The slide plate 68 continues to move rearward, permitting the swingable rods 72 and 73 to move the left and right, vertical blades 37 and 38 close to each other, allowing their edges to turn from the parallel to the convergent position, when the actuator pin 57 is depressed in the liner 45, thus permitting the roll 64 of the swingable rod 69 to ride over the depressed actuator pin 57 (see FIG. 17c).

The vegetable block chamfering machine according to the second embodiment of the present invention has one set of different chamfering blades on either side of the vegetable carrier 12 in the order of the inverted "V"-shaped blade 34, the upper and lower, horizontal chamfering blades 35 and 36, and the left and right, vertical chamfering blades 37 and 38. It uses a single slider unit 40 for reciprocating the vegetable carrier 12, thereby permitting the two sets of different chamfering blades to work alternately, thus chamfering two blocks of vegetable B each time of reciprocation.

While one of the two sets of different chamfering blades work, the other set is allowed to return to its initial positions, thus permitting the saving of space required for installation, and the motor can be effectively used.

A chamfering machine according to the present invention can be used effectively in chamfering elongated cuboid blocks of vegetable such as potatoes or carrots into bite-sized rimless pieces. For the purpose of cutting and removing the corner ridges of an elongated cuboid block of vegetable the chamfering blades are integrally connected to their rotary axles, and such chamfering blades are operatively connected to a link mechanism. This arrangement has the effect of increasing the strength with which the rotary blades are attached to the machine frame, thus eliminating the possibility of being broken by vegetable debris stuck to the pivots of the chamfering blades. Also, advantageously the sharpness of the chamfering blade remains well even if the machine is used for an elongated length of time.

The symmetric arrangement of two sets of different chamfering blades relative to the center of the machine bed permits the alternate chamfering in such a way that one set of chamfering blades work while the other set is allowed to return to its initial position accordingly improving chamfering efficiency.

What is claimed is:

1. A vegetable block chamfering apparatus, comprising:
a chamfering blade situated in the path in which a selected block of vegetable is transported, said chamfering blade having an edge directed toward the vegetable block;
a blade axle;
guide means for guiding in the traversing direction relative to the direction in which the block of vegetable is transported;
a swingable rod, said blade axle being fixed to one end of said swingable rod permitting the other end of said swingable rod to be moved in the direction parallel to the direction in which the block of vegetable is transported;
said chamfering blade being integrally connected to said blade axle, which is in engagement with said guide means;
a vegetable carrier placed in front of said chamfering blade; and
vegetable block transporting means for transporting the block of vegetable in the transporting path with the block of vegetable pinched and held, said vegetable block transporting means is so operatively connected to the other end of the swingable rod as to push it, whereby said swingable rod is made to swing about the blade axle, causing the chamfering blade to turn about the blade axle while moving and chamfering the block of vegetable under the guidance provided by the guide means in the counter direction to the direction in which the block of vegetable is transported.

2. A vegetable block chamfering apparatus, comprising:
two chamfering blades located in the path in which a selected block of vegetable is transported, said two chamfering blades each having edges directed toward the vegetable block;
a blade axle for each chamfering blade;
guide means for guiding in the traversing direction relative to the direction in which the block of vegetable is transported;
a swingable rod which can swing back and forth about a pivot;
each of said two chamfering blades is integrally connected to a blade axle, which is placed in engagement with said guide means, and the blade axle of one of the chamfering blades is fixed to one end of a rotary connection rod whereas the blade axle of the other chamfering blade is fixed to one end of another rotary connection rod;
the other end of each rotary connection rod being rotatably connected to said swingable rod;
a vegetable carrier placed in front of said two chamfering blades; and
a vegetable block transporting means for transporting the block of vegetable on the transporting way with the block of vegetable pinched and held, said vegetable block transporting means being operatively connected to the end of the swingable rod, whereby said swingable rod is formed to swing back and forth about its pivot in unison with the vegetable block transporting means, thereby allowing said chamfering blades to turn about their blade axles while moving and chamfering the block of the vegetable under the guidance provided by the guide means in the counter direction to the direction in which the block of vegetable is transported.

3. A vegetable block chamfering apparatus, comprising:
two chamfering blades located in the path in which a selected block of vegetable is transported, said two chamfering blades each having edges directed toward the vegetable block;
a blade axle for each chamfering blade;
guide means for guiding in the traversing direction relative to the direction in which the block of vegetable is transported;

a drive plate which can be drive back and forth in a linear passage;

each of said chamfering blades is integrally connected to a blade axle, which is placed in engagement with said guide means, and the blade axle of one of the chamfering blades is fixed to one end of a rotary connection rod whereas the blade axle of the other chamfering blade is fixed to one end of another rotary connection rod;

the other end of each rotary connection rod is rotatably to said drive plate;

a vegetable carrier placed in front of said two chamfering blades; and a vegetable block transporting means for transporting the block of vegetable on the transporting way with the block of vegetable pinched and held, said vegetable block transporting means being operatively connected to said drive plate, whereby said drive plate is moved back and forth in unison with said vegetable block transporting means, thereby allowing said chamfering blades to turn about their blade axles while moving and chamfering the block of the vegetable under the guidance provided by said guide means in the counter direction to the direction in which the block of vegetable is transported.

4. A vegetable block chamfering apparatus, comprising:

an inverted "V"-shaped chamfering blade, upper and lower horizontal chamfering blades and left and right, vertical chamfering blades arranged sequentially in the path in which a selected block of vegetable is transported, said blades each having edges directed toward the vegetable block;

a plurality of blade axles;

first swingable rod, a second swingable rods, another second swingable rod a third swingable rod and another third swingable rod;

first, second and third guide means;

two drive plates which can be driven back and forth on a linear passage;

one of said blade axles being integrally connected to said inverted "V"-shaped chamfering blade, and is fixed to one end of said first swingable rod;

one of said blade axles being connected to each of said upper and lower horizontal chamfering blades, and placed in engagement with said second guide means, one of said blade axles being fixed to one end of said second swingable rod whereas the other blade axle being fixed to one end of said another second swingable rod;

one of said blade axles beging connected to each of said left and right vertical chamfering blades, and is placed in engagement with said third guide means, one of said axles being fixed to one end of said third swingable rod whereas the other blade axle being fixed to one end of said another third swingable rod;

the other end of each second swingable rod being rotatably connected to said drive plate;

a vegetable carrier placed in front of said inverted "V"-shaped chamfering blade; and a vegetable block transporting means for transporting the block of vegetable on the transporting path with the block of vegetable pinched and held, said vegetable block transporting means being operatively connected to said first swingable rod and said two drive plates, whereby said first swingable rod and said two drive plates move back and forth in unison with said vegetable block transporting means, thereby allowing all chamfering blades to turn about their blade axles while moving and chamfering the block of the vegetable under the guidance provided by said guide means in the counter direction to the direction in which the block of vegetable is transported.

\* \* \* \* \*

UNITED STATES PATENT AND TRADEMARK OFFICE
CERTIFICATE OF CORRECTION

PATENT NO. : 6,176,177 B1
DATED : January 23, 2001
INVENTOR(S) : Kojiro Ito

Page 1 of 1

It is certified that error appears in the above-identified patent and that said Letters Patent is hereby corrected as shown below:

Claim 2, column 14,
Line 51, "formed" should be -- made --.

Claim 3, column 15,
Line 1, "drive" (second occurrence) should be -- driven --.

Claim 4, column 15,
Line 36, a -- , -- should be inserted after "rod" (first occurrence); and Column 16,
Line 14, "beging" should be -- being --.

Signed and Sealed this

Twenty-third Day of October, 2001

Attest:

NICHOLAS P. GODICI
Attesting Officer
Acting Director of the United States Patent and Trademark Office